United States Patent [19]
Naito et al.

[11] Patent Number: 5,983,178
[45] Date of Patent: Nov. 9, 1999

[54] SPEAKER CLUSTERING APPARATUS BASED ON FEATURE QUANTITIES OF VOCAL-TRACT CONFIGURATION AND SPEECH RECOGNITION APPARATUS THEREWITH

[75] Inventors: Masaki Naito, Nara, Japan; Li Deng, Kitchener, Canada; Yoshinori Sagisaka, Soraku-gun, Japan

[73] Assignee: ATR Interpreting Telecommunications Research Laboratories, Kyoto, Japan

[21] Appl. No.: 09/208,590

[22] Filed: Dec. 10, 1998

[30] Foreign Application Priority Data

Dec. 10, 1997 [JP] Japan .................................. 9-339881

[51] Int. Cl.⁶ ..................................................... G10L 3/00
[52] U.S. Cl. .......................... 704/245; 704/256; 704/261
[58] Field of Search .................................... 704/245, 250, 704/256, 261

[56] References Cited

FOREIGN PATENT DOCUMENTS 7-261785  10/1995  Japan .
8-110792   4/1996  Japan .

OTHER PUBLICATIONS

G. Fant, "Non–Uniform Vowel Nowael Normalization"; *Speech Transmission Laboratory Quarterly Progress and Status Report*, vol. 2–3, pp. 1–19, 1975.

Tetsuo Kosaka et al.; "Speaker–Independent Speech Recognition Based On Tree–Structure Speaker Clustering", *Computer Speech and Language*, No. 10, pp. 55–74, 1996.

*Primary Examiner*—Susan Wieland

[57] ABSTRACT

A speaker clustering apparatus generates HMMs for clusters based on feature quantities of a vocal-tract configuration of speech waveform data, and a speech recognition apparatus provided with the speaker clustering apparatus. In response to the speech waveform data of N speakers, an estimator estimates feature quantities of vocal-tract configurations, with reference to correspondence between vocal-tract configuration parameters and Formant frequencies predetermined based on a predetermined vocal tract model of a standard speaker. Further, a clustering processor calculates speaker-to-speaker distances between the N speakers based on the feature quantities of the vocal-tract configurations of the N speakers as estimated, and clusters the vocal-tract configurations of the N speakers using a clustering algorithm based on calculated speaker-to-speaker distances, thereby generating K clusters. Then the clustering processor trains an initial HMM based on the speech waveform data of speakers respectively belonging to the generated K clusters, thereby generating K hidden Markov models corresponding to the K clusters.

9 Claims, 14 Drawing Sheets

Fig. 1  First Preferred Embodiment

Model SM'm of Section SMm of Vocal-Tract Configuration

Vocal-Tract Configuration

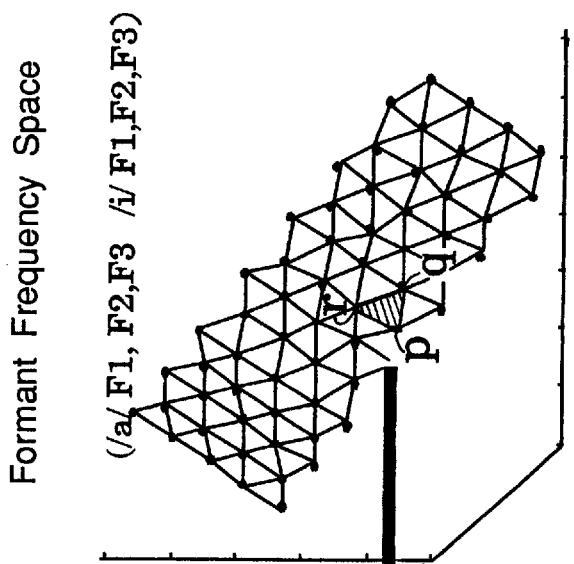
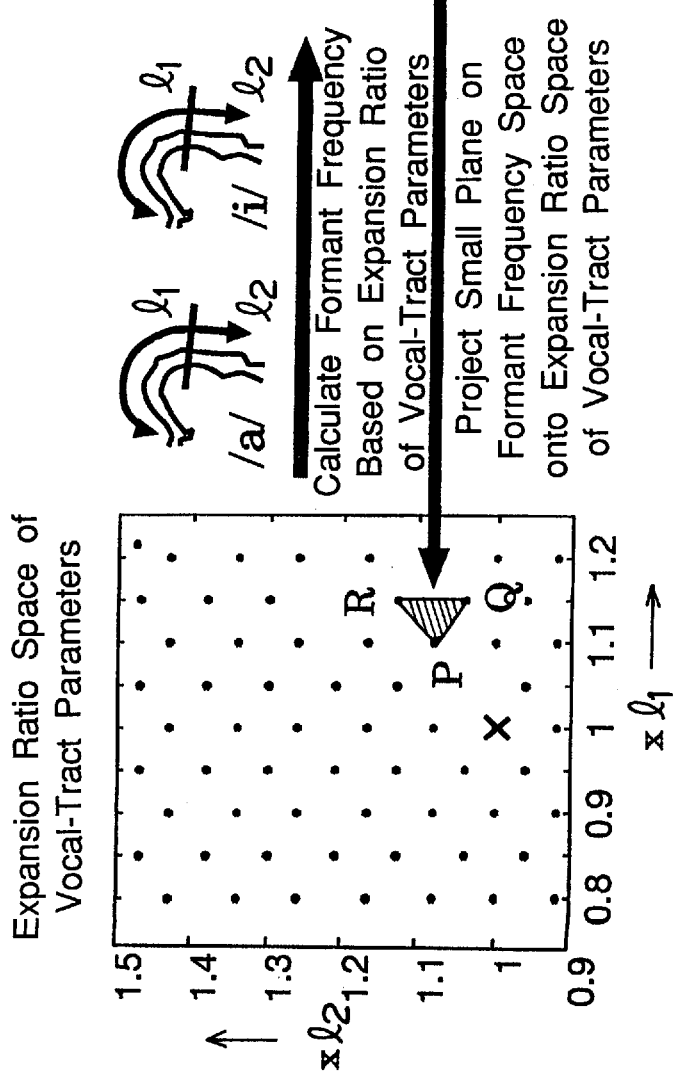
Fig. 5B
Fig. 5A

Formant Frequency Space

Vocal-Tract Parameter Estimating Method

Expansion Ratio Space of Vocal-Tract Parameters

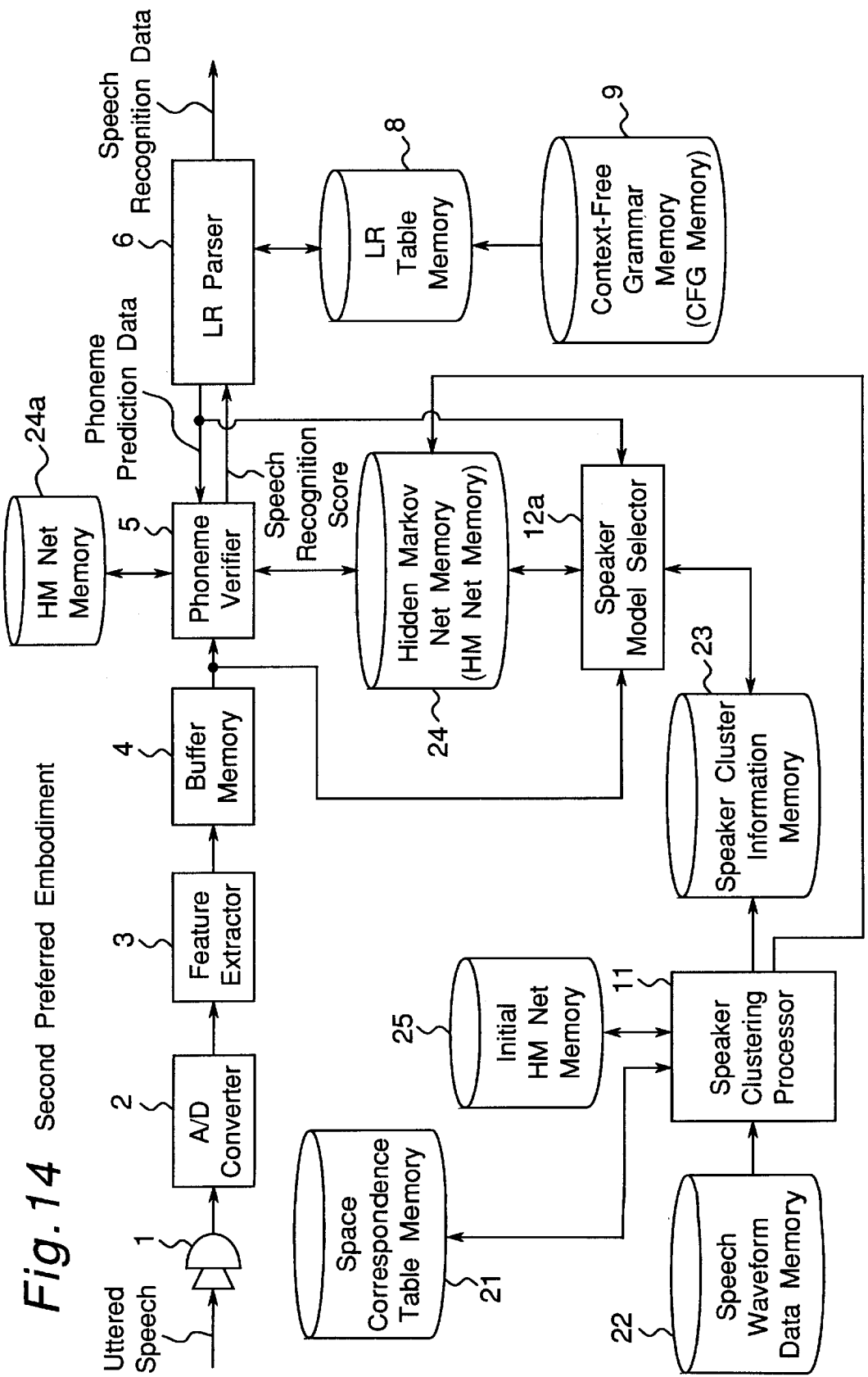
Fig. 14 Second Preferred Embodiment

SPEAKER CLUSTERING APPARATUS BASED ON FEATURE QUANTITIES OF VOCAL-TRACT CONFIGURATION AND SPEECH RECOGNITION APPARATUS THEREWITH

BACKGROUND OF THE INVENTION

1. Field of the Invention

The present invention relates to a speaker clustering apparatus based on feature quantities of a vocal-tract configuration, and a speech recognition apparatus provided with the speaker clustering apparatus. In particular, it relates to a speaker clustering apparatus for generating hidden Markov models (hereinafter, referred to as HMMs) for a plurality of clusters by performing a speaker clustering process based on feature quantities of a vocal-tract configuration of speech waveform data. It further relates to a speech recognition apparatus for recognizing speech by selecting an HMM, which is optimum for a speaker targeted for speech recognition, from the HMMs of the plurality of clusters generated by the speaker clustering apparatus.

2. Description of the Prior Art

Use of gender-dependent acoustic models for speech recognition is an effective way to improve the recognition performance. However, since there is still a wide variety of speakers having different features even within each same gender, several speaker clustering methods for obtaining more detailed speaker cluster models have been proposed. For example, the Japanese Patent Laid-Open Publication No. 7-261785 proposed not only a tree-structured, hierarchical speaker clustering method but also a fast speaker adaptation method based on selection of speaker clusters defined on the tree structure of speaker clusters. The effectiveness of these methods also as an initialization model for speaker adaptation was disclosed in, for example, the Japanese Patent Laid-Open Publication No. 8-110792.

In order to obtain highly efficient speaker clusters by such a speaker clustering method, there is a need of setting an appropriate distance across speakers. In previous work on speaker clustering, acoustic feature quantities, in particular, distances across acoustic models to be used for the recognition of speaker dependent HMMs or the like have widely been used as distances across speakers for clustering.

However, in the speaker clustering using distances across acoustic models to be used for the recognition of speaker-dependent HMMs or the like, as shown in these prior arts, there have been such problems that large amounts of speech waveform data would be required to obtain a higher speech recognition rate, it is necessary to provide a storage unit having a large storage capacity, while the amount of computations involved in speaker clustering would become very large. Further, in speech recognition using HMMs resulting from speaker clustering with relatively low amounts of speech waveform data, there has been another problem that the speech recognition rate would still be low.

SUMMARY OF THE INVENTION

An object of the present invention is to provide a speaker clustering apparatus, which is capable of generating a HMM which can obtain a speech recognition rate higher than that of the prior art, when speech recognition is done by using HMMs resulting from speaker clustering with low amounts of speech waveform data.

Another object of the present invention is to provide a speech recognition apparatus, which is capable of recognizing speech with a speech recognition rate higher than that of the prior art, when speech recognition is done by using HMMs resulting from speaker clustering with low amounts of speech waveform data.

According to one aspect of the present invention, there is provided a speaker clustering apparatus comprising:

a first storage unit for storing speech waveform data of a plurality of N speakers;

a first estimator for estimating feature quantities of vocal-tract configurations, each being anatomical configuration of vocal tract of each speaker, with reference to correspondence between vocal-tract configuration parameters and Formant frequencies predetermined from a predetermined vocal tract model of a standard speaker, based on the speech waveform data of the plurality of N speakers stored in said first storage unit; and a clustering processor for calculating speaker-to-speaker distances between the N speakers based on the feature quantities of the vocal-tract configurations of the N speakers estimated by said first estimator, and clustering the N speakers using a predetermined clustering algorithm based on calculated speaker-to-speaker distances, thereby generating a predetermined plurality of K clusters, and for training a predetermined initial hidden Markov model using a predetermined training algorithm based on the speech waveform data of speakers respectively belonging to the generated K clusters, which is stored in said first storage unit, thereby generating a plurality of K hidden Markov models corresponding to the plurality of K clusters.

In the above-mentioned speaker clustering apparatus, the feature quantities of the vocal-tract configuration preferably include a first length on an oral cavity side of a speaker's vocal tract, and a second length on its pharyngeal cavity side.

In the above-mentioned speaker clustering apparatus, the feature quantities of the vocal-tract configuration preferably include vocal-tract lengths of speakers.

According to another aspect of the present invention, there is provided a speech recognition apparatus comprising:

a first storage unit for storing speech waveform data of a plurality of N speakers;

a first estimator for estimating feature quantities of vocal-tract configurations, each being anatomical configuration of vocal tract of each speaker, with reference to correspondence between vocal-tract configuration parameters and Formant frequencies predetermined from a predetermined vocal tract model of a standard speaker, based on the speech waveform data of the plurality of N speakers stored in said first storage unit;

a clustering processor for calculating speaker-to-speaker distances between the N speakers based on the feature quantities of the vocal-tract configurations of the N speakers estimated by said first estimator, and clustering the N speakers using a predetermined clustering algorithm based on calculated speaker-to-speaker distances, thereby generating a predetermined plurality of K clusters, and for training a predetermined initial hidden Markov model using a predetermined training algorithm based on the speech waveform data of speakers respectively belonging to the generated K clusters, which is stored in said first storage unit, thereby generating a plurality of K hidden Markov models corresponding to the plurality of K clusters;

a second storage unit for storing the plurality of K hidden Markov models generated by said clustering processor;

a third storage unit for storing information of feature quantities of the vocal-tract configurations of speaker clusters belonging to the plurality of K hidden Markov models stored in said second storage unit;

a second estimator for estimating feature quantities of vocal-tract configurations of a recognition-target speaker with reference to said predetermined correspondence between the vocal-tract configuration parameters and the Formant frequencies, based on an inputted uttered speech signal of the recognition-target speaker;

a speaker model selector for selecting at least one hidden Markov model having feature quantities of a vocal-tract configuration of a speaker cluster closest to feature quantities of a vocal-tract configuration of the recognition-target speaker from the plurality of K hidden Markov models stored in said second storage unit by comparing the feature quantities of the vocal-tract configuration of the recognition-target speaker estimated by said second estimator with the information of the vocal-tract configurations of the speaker clusters stored in said third storage unit; and a speech recognition unit for recognizing speech of the inputted uttered speech signal of the recognition-target speaker with reference to the hidden Markov model selected by said speaker model selector, and outputting speech recognition data.

In the above-mentioned speaker clustering apparatus, the feature quantities of the vocal-tract configuration preferably include a first length on an oral cavity side of a speaker's vocal tract, and a second length on its pharyngeal cavity side.

In the above-mentioned speaker clustering apparatus, the feature quantities of the vocal-tract configuration preferably include vocal-tract lengths of speakers.

According to a further aspect of the present invention, there is provided a speech recognition apparatus comprising:

a first storage unit for storing speech waveform data of a plurality of N speakers;

a first estimator for estimating feature quantities of vocal-tract configurations, each being anatomical configuration of vocal tract of each speaker, with reference to correspondence between vocal-tract configuration parameters and Formant frequencies predetermined from a predetermined vocal tract model of a standard speaker, based on the speech waveform data of the plurality of N speakers stored in said first storage unit;

a clustering processor for calculating speaker-to-speaker distances between the N speakers based on the feature quantities of the vocal-tract configurations of the N speakers estimated by said first estimator, and clustering the N speakers using a predetermined clustering algorithm based on calculated speaker-to-speaker distances, thereby generating a predetermined plurality of K clusters, and for training a predetermined initial hidden Markov model using a predetermined training algorithm based on the speech waveform data of speakers respectively belonging to the generated K clusters, which is stored in said first storage unit, thereby generating a plurality of K hidden Markov models corresponding to the plurality of K clusters;

a second storage unit for storing the plurality of K hidden Markov models generated by said clustering processor;

a first speech recognition unit for recognizing speech of an inputted uttered speech signal of a recognition-target speaker with reference to a predetermined speaker independent phonemic hidden Markov model, and outputting a series of speech-recognized phonemes;

a speaker model selector for recognizing the speech of the inputted uttered speech signal, respectively, with reference to the plurality of K hidden Markov models stored in said second storage unit, based on the sequence of speech-recognized phonemes outputted from said first speech recognition unit, thereby calculating K likelihoods corresponding to the K hidden Markov models, and for selecting at least one hidden Markov model having the largest likelihood from the K hidden Markov models; and a second speech recognition unit for recognizing again the speech of the inputted uttered speech signal with reference to the hidden Markov model selected by said speaker model selector, and outputting speech recognition data.

In the above-mentioned speaker clustering apparatus, the feature quantities of the vocal-tract configuration preferably include a first length on an oral cavity side of a speaker's vocal tract, and a second length on its pharyngeal cavity side.

In the above-mentioned speaker clustering apparatus, the feature quantities of the vocal-tract configuration preferably include vocal-tract lengths of speakers.

Accordingly, according to the present invention, the feature quantities of the speakers' vocal-tract configuration can be estimated from a small amount of two vowels or the like, allowing a speaker cluster model to be built with a small amount of speech data. Also, in the process of speech recognition, a speaker cluster model can be selected based on a small amount of speech waveform data, allowing high-speed speaker adaptation to be realized. Further, when speech recognition is performed with HMMs speaker-clustered by using a small amount of speech waveform data, there can be obtained a speech recognition rate higher than that of the prior art.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIGS. 5A and 5B show a method for mapping between an expansion ratio space of vocal-tract parameters and a Formant frequency space, the method being executed in the vocal-tract configuration estimating process of FIG. 2, wherein FIG. 5A is a chart showing an expansion ratio space of vocal-tract parameters, and FIG. 5B is a chart showing a Formant frequency space;

FIGS. 6A and 6B show a vocal-tract parameter estimation method which is executed in the vocal-tract configuration estimating process of FIG. 2, wherein FIG. 6A is a chart showing an expansion ratio space of vocal-tract parameters, and FIG. 6B is a chart showing a Formant frequency space;

FIG. 14 is a block diagram showing a constitution of a speech recognition apparatus of the second preferred embodiment according to the present invention.

DETAILED DESCRIPTION OF THE PREFERRED EMBODIMENTS

Preferred embodiments according to the present invention will be described below with reference to the attached drawings.

FIRST PREFERRED EMBODIMENT

Figure 1:
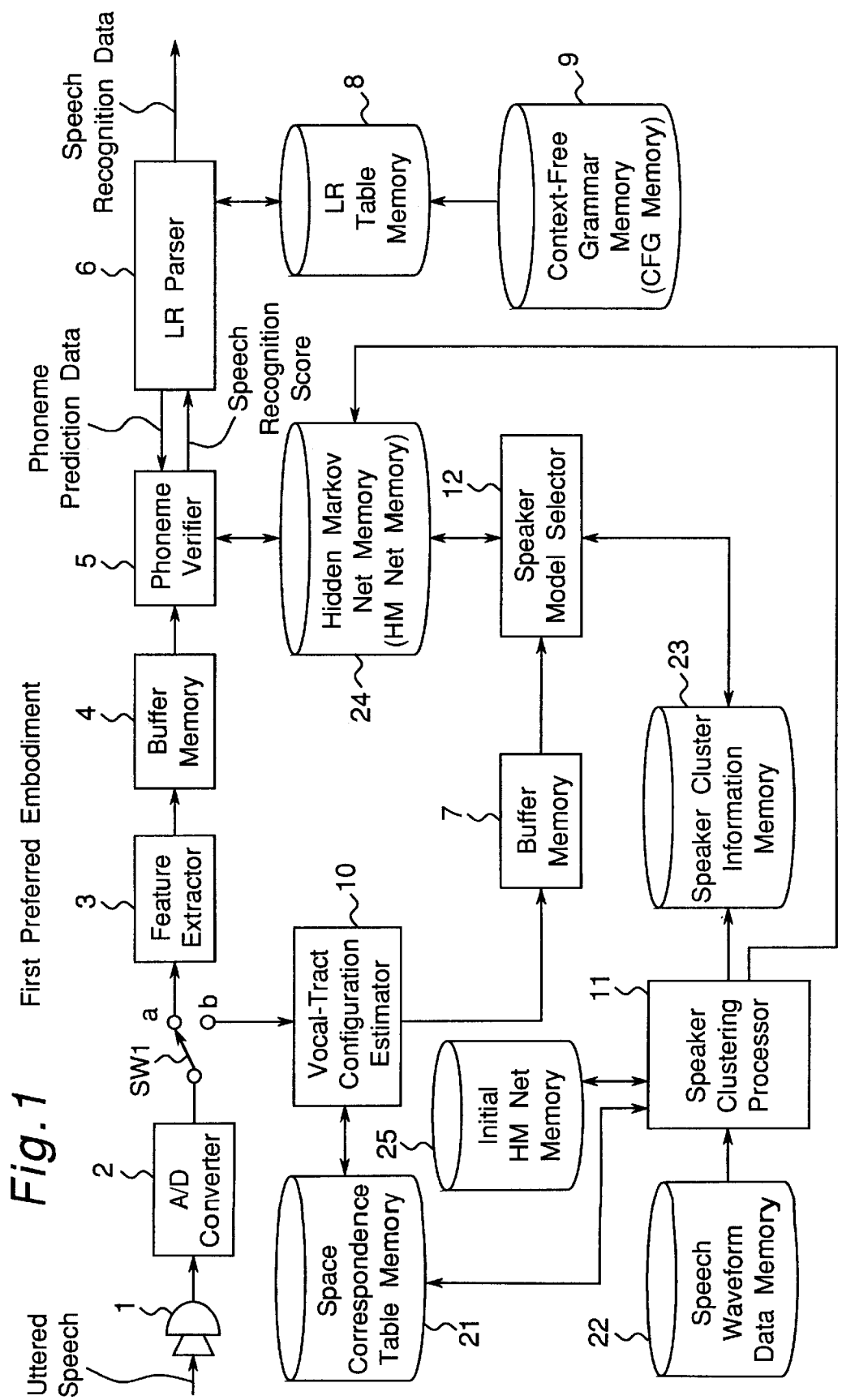
FIG. 1 is a block diagram showing a constitution of a speech recognition apparatus of a first preferred embodiment according to the present invention.

FIG. 1 is a block diagram showing a constitution of a speech recognition apparatus of the first preferred embodiment according to the present invention. The speech recognition apparatus of the present preferred embodiment is characterized by comprising a vocal-tract configuration estimator or estimating section 10, a speaker clustering processor or processing section 11, and a speaker model selector or selecting section 12.

Referring to FIG. 1, the speech recognition apparatus of the present preferred embodiment is characterized, in particular, by comprising the followings:

(a) a speech waveform data memory 22, which stores speech waveform data of a plurality of N speakers;

(b) the speaker clustering processor 11, which (b1) estimates feature quantities of vocal-tract configuration, each being an anatomical configuration of vocal tract of each speaker, with reference to a space correspondence table showing correspondence between vocal-tract configuration parameters and Formant frequencies stored in a space correspondence table memory 21 and being predetermined from a predetermined vocal-tract model of a standard speaker, based on the speech waveform data of the plurality of N speakers stored in the speech waveform data memory 22, (b2) calculates speaker-to-speaker distances between the N speakers based on the estimated vocal-tract configuration feature quantities of the N speakers, and (b3) clusters the vocal-tract configurations of the N speakers based on the calculated speaker-to-speaker distances, with use of a predetermined clustering algorithm, thereby generating a predetermined plurality of K clusters, and (b4) further trains a predetermined initial HMM stored in an initial HM Net memory 25 with use of a predetermined ML training algorithm based on speech waveform data of speakers belonging to the generated K clusters, thereby generating the plurality of K HMMs corresponding to the plurality of K clusters;

(c) a hidden Markov Net (Network) memory (hereinafter, referred to as an HM Net memory) 24, which stores the plurality of K HMMs generated by the speaker clustering processor 11;

(d) a speaker cluster information memory 23, which stores information of the vocal-tract configuration feature quantities of the speaker clusters belonging to the plurality of K HMMs stored in the HM Net memory 24;

(e) a vocal-tract configuration estimator 10, which in response to an inputted uttered speech of a recognition-target speaker to be speech-recognized, estimates the feature quantities of the vocal-tract configuration of the recognition-target speaker, with reference to the correspondence between vocal-tract configuration parameters and Formant frequencies previously determined based on a predetermined vocal-tract model of a standard speaker;

(f) a speaker model selector 12, which selects at least one HMM having feature quantities of a vocal-tract configuration of a speaker cluster closest to the feature quantities of the vocal-tract configuration of the recognition-target speaker from a plurality of K HMMs stored in the HM Net memory 24 by comparing the feature quantities of the vocal-tract configuration of the recognition-target speaker estimated by the vocal-tract configuration estimator 10 with the information of the feature quantities of the vocal-tract configuration of speaker clusters stored in the speaker cluster information memory 23; and (g) a phoneme verifier or checking section 5 and an LR parser 6, which constitute a speech recognition unit, and which recognize the inputted uttered speech of the recognition-target speaker with reference to the HMM selected by the speaker model selector 12, and outputting the speech recognition result.

Figure 4B:
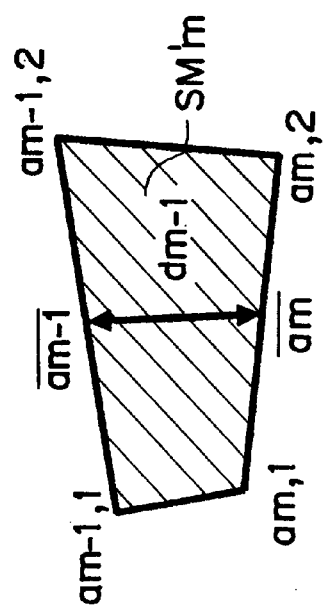
FIG. 4B is a sectional view showing a model SMm' of a section SMm of a vocal-tract configuration which is a result of modeling the vocal-tract configuration of FIG. 4A.
Figure 4A:
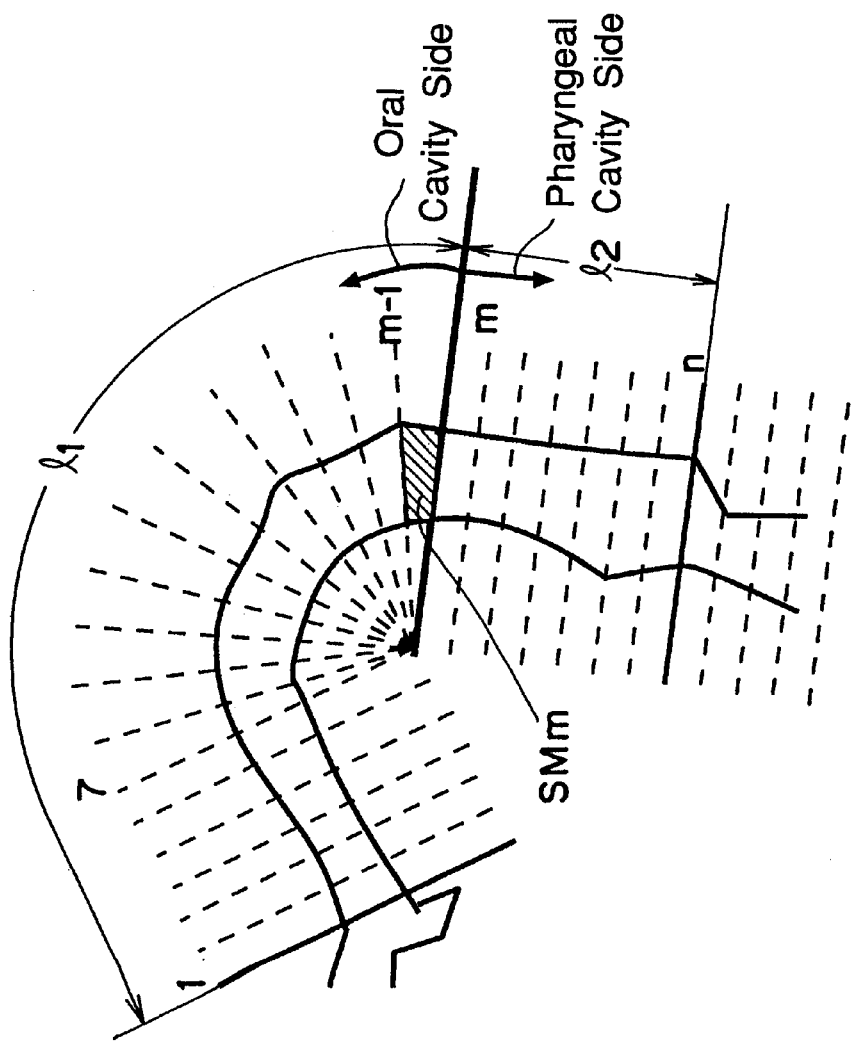
FIG. 4A is a sectional view showing a vocal-tract configuration of a person.

It is noted that in the present preferred embodiment, the feature quantities of the vocal-tract configuration preferably include a first length $l_1$ on the oral cavity side of the speaker's vocal tract and a second length $l_2$ on its pharyngeal cavity side as shown in FIG. 4, or a vocal-tract length VTL of speakers.

First of all, the feature quantity of anatomical configuration of the human vocal tract (hereinafter, referred to as vocal-tract configuration) to be used for speaker clustering, and the method for estimating the feature quantity will be described. In the researches for speaker normalization, the normalization is performed by focusing principally on the speaker's vocal tract length VTL. However, acoustic features of the speaker's speech characterized only by the vocal-tract length VTL are limitative, and they can not clearly represent the whole acoustic features (See, for example, Prior Art Reference 1, "G. Fant, "Non-uniform vowel normalization", Speech Transmission Laboratory Quarterly Progress and Status Report, Vol. 2–3, 1975, pp. 1–19"). Therefore, in the present preferred embodiment, the feature quantity of vocal-tract configuration used in speaker clustering is given by dividing the vocal tract into two sections including the front section located at the oral cavity side and the rear section located at the pharyngeal cavity side, as shown in FIG. 4, and then, we use two parameters of their respective lengths $l_1$ and $l_2$ (hereinafter, referred to as vocal-tract parameters). The reasons that these parameters are selected are as follows:

(1) Speech uttered by the speaker is largely affected by the front and rear lengths of the vocal tract (See, for example, Prior Art Reference 1);

(2) There have been proposed relatively simple methods for estimating these vocal-tract parameters; and (3) These parameters are a simple extension of the vocal-tract length generally used in the research of speaker normalization.

In addition, it is noted that the point at which the two sections of oral and pharyngeal sides are divided is, preferably, set to near an intermediate point between the oral cavity and the pharynx.

In the present preferred embodiment, the vocal-tract parameters $l_1$ and $l_2$ are estimated using a method of mapping from a Formant frequency space to a vocal-tract parameter space as described below, by using Formant frequencies $F_1$, $F_2$ and $F_3$ of the speaker's two vowels /a/ and /i/. The following vocal-tract model is used for estimation of the vocal-tract parameters $l_1$ and $_2$.

For modeling of human vocal-tract configuration, a model is generally derived from the areas of individual cross sections and the distances dm-1 between the cross sections when cutting the vocal tract into round slices at n places. Use of this model makes it possible to generate speech uttered by each speaker, based on the vocal-tract configuration of the speaker. On the other hand, when the model is applied to the speech recognition apparatus, such a vocal-tract configuration is difficult to measure. Therefore, there is a need for estimating the vocal-tract configuration based on speech uttered by each speaker. Among feature quantities of such vocal-tract configuration, in particular, the oral-cavity side length $l_1$ and the pharyngeal-cavity side length $l_2$ of the vocal tract, and the vocal-tract length VTL largely affect the speech uttered by each speaker. Therefore, these parameters are used as the feature quantities of vocal-tract configuration.

In the case where the lengths $l_1$ and $l_2$ of two sections resulting from dividing the vocal tract into two sections as cut on the section SMm, including the oral-cavity side and the pharyngeal-cavity side are used as the feature quantities of the speaker's vocal-tract configuration, these feature quantities are calculated based on the above-mentioned vocal-tract configuration model by the following equations:

$$l_1 = \sum_{i=1}^{m-1} d_i, \quad (1)$$

and $$l_2 = \sum_{i=m}^{n-1} d_i. \quad (2)$$

Further, when the vocal-tract length VTL is used as the feature quantity of the speaker's vocal-tract configuration, this feature quantity is calculated based on the above-mentioned vocal-tract configuration model by the following equation:

$$VTL = \sum_{i=1}^{n-1} d_i. \quad (3)$$

Figure 6B:
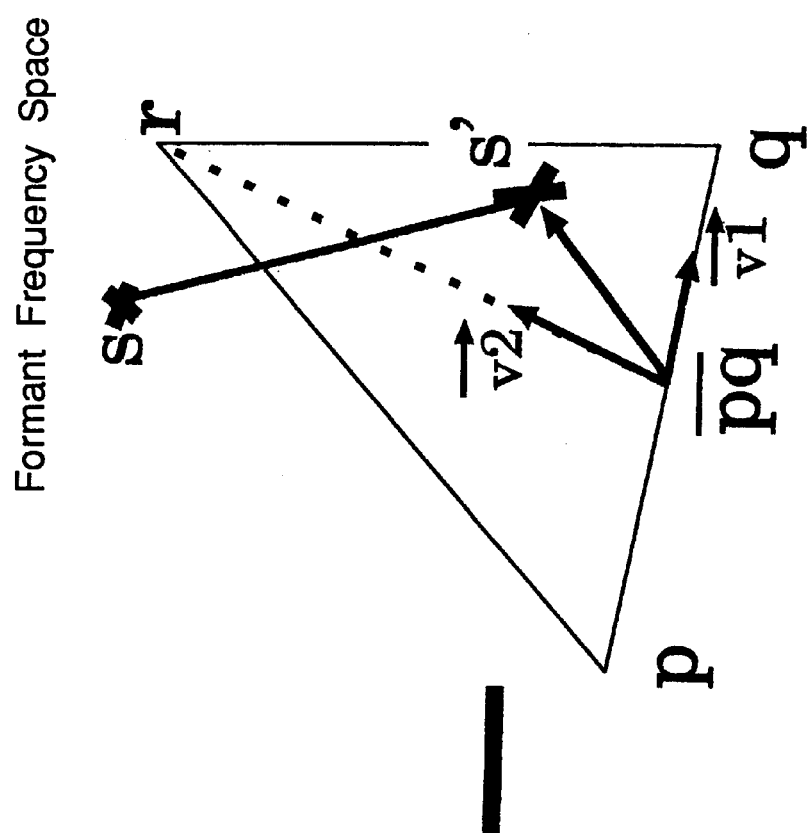
Figure 6A:
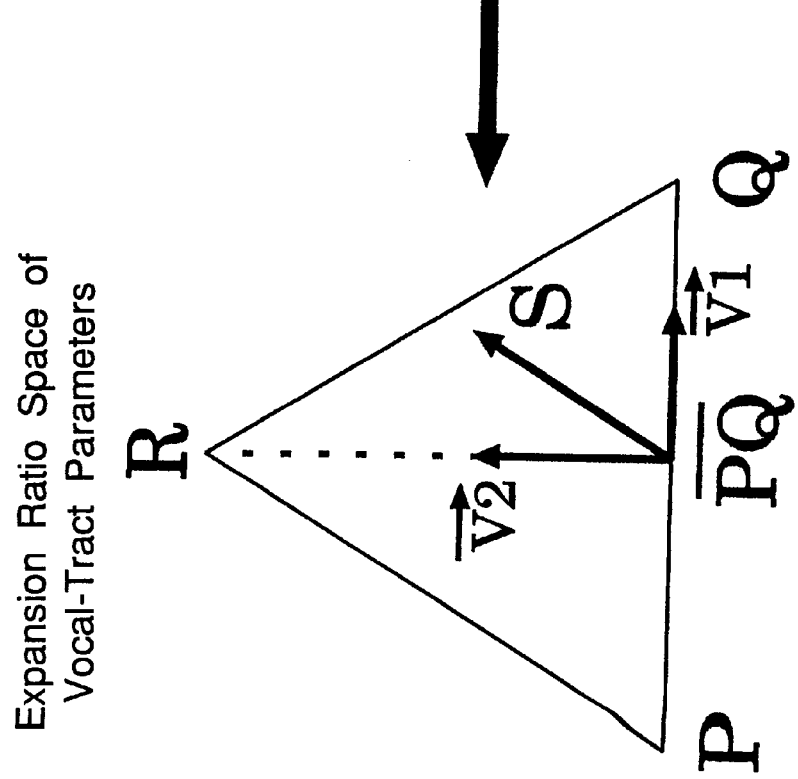

The above model represents the vocal-tract configuration of a speaker by two parameters that are independent of uttered phonemes, i.e., the oral-cavity side length $l_1$ of the vocal tract, and the pharyngeal-cavity side length $l_2$ of the vocal tract. In this vocal-tract model, there are prepared the vocal-tract parameters $l_1$ and $l_2$ of a standard speaker as well as vocal-tract area functions corresponding to individual vowels. The two vocal-tract parameters $l_1$ and $l_2$ are expanded or contracted to some fold independently of each other, thereafter generating speech. Then Formant frequencies of individual vowels uttered from vocal tracts of different configurations can be obtained. Further, in the present preferred embodiment, by changing the ratio of such expansion and contraction (referred to as an expansion ratio hereinafter) for the vocal-tract parameters in various ways, expansion ratios to the vocal-tract parameters of the standard speaker as well as Formant frequencies for the individual vowels corresponding to the expansion ratios are determined. As a result, as shown in FIGS. 5 and 6, there can be obtained a small plane "PQR" formed by three neighboring points on the expansion ratio space of the two-dimensional vocal-tract parameters, and a small plane "pqr" on the Formant frequency space corresponding to the small plane "PQR". In this case, the expansion ratio space of the vocal-tract parameters can be said to be a vocal-tract parameter normalization space. In addition, referring to FIG. 5B, the Formant frequency space is a space having six dimensions consisting of the Formant frequencies $F_1$, $F_2$ and $F_3$ of the phoneme /a/ and the Formant frequencies $F_1$, $F_2$ and $F_3$ of the phoneme /i/.

The estimation of the vocal-tract parameters is, conversely, executed by mapping from the small plane on the Formant frequency space onto the small plane on the expansion ratio space of the vocal-tract parameters. The procedure for vocal-tract parameter estimation is shown below.

Figure 2:
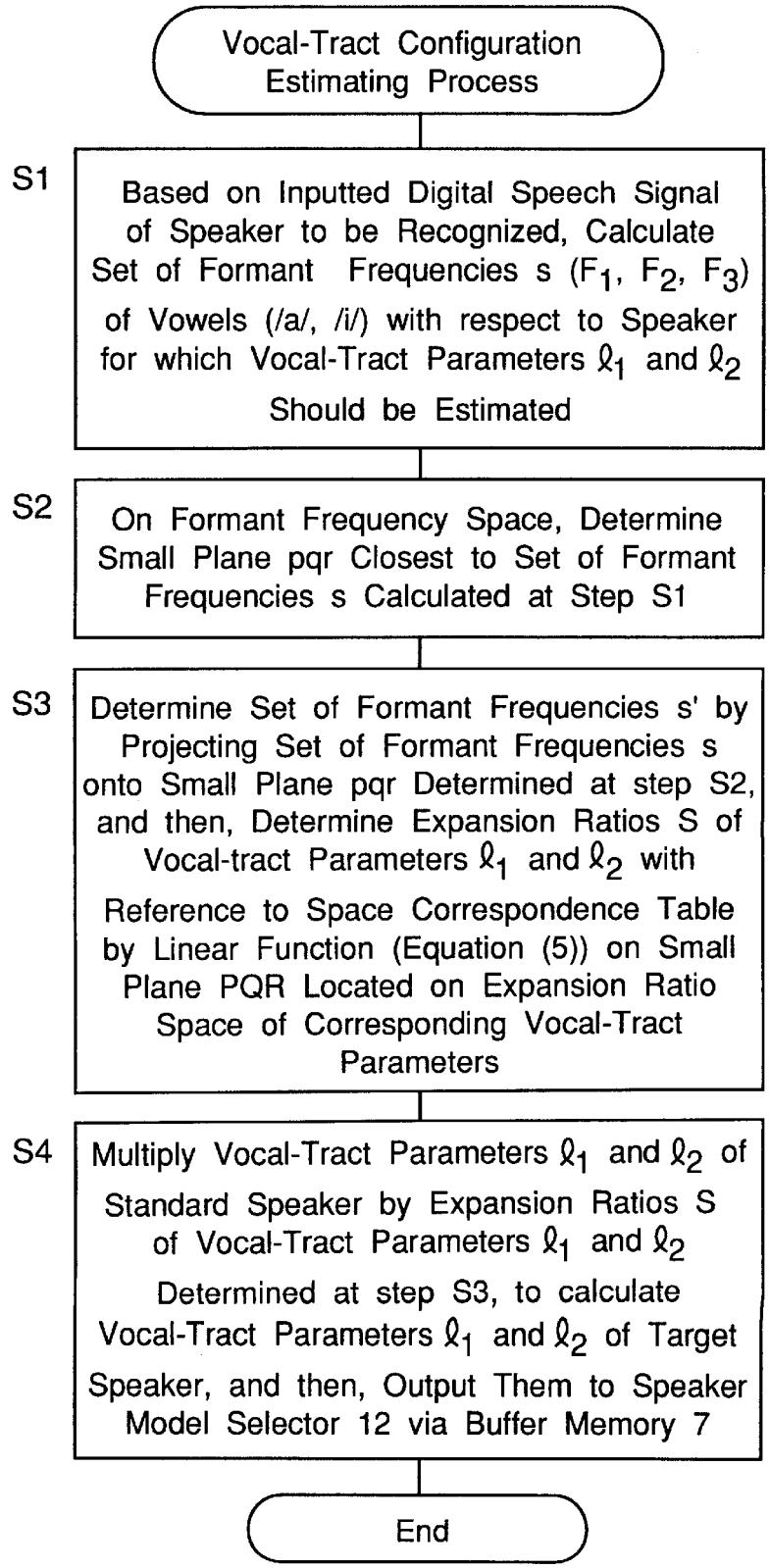
FIG. 2 is a flow chart showing a vocal-tract configuration estimating process which is executed by a vocal-tract configuration estimator 10 of FIG. 1.

FIG. 2 is a flow chart showing a vocal-tract configuration estimating process which is executed by the vocal-tract configuration estimator 10 of FIG. 1. Prior to this estimation process, a space correspondence table between the small plane on the expansion ratio space of the vocal-tract parameters and the small plane on the Formant frequency space is previously prepared based on the vocal-tract parameters of the standard speaker, and is stored in the space correspondence table memory 21. In this space correspondence table, there are stored a plurality of sets consisting of parameter sets of the small plane on the expansion ratio space of the vocal-tract parameters and parameter sets of the small plane on the Formant frequency space.

Referring to FIG. 2, at step S1, first of all, the speaker to be speech-recognized utters vowels /a/ and /i/, and the uttered speech is inputted to a microphone 1 of FIG. 1, which then converts the inputted speech into a speech signal. Thereafter, the speech signal is subjected to A/D conversion so as to be converted into a digital speech signal by an A/D converter 2. The digital speech signal is inputted to the vocal-tract configuration estimator 10 via the "b" side of a switch SW1, which is switched over to the "b" side at the first stage. In response to this, the vocal-tract configuration estimator 10, as shown in FIG. 5, determines a Formant-frequency set s ($F_1$, $F_2$, $F_3$) of the vowels /a/ and /i/ based on the inputted digital speech signal with respect to the speaker for which the vocal-tract parameters $l_1$ and $l_2$ are to be estimated. Then, at step S2, as shown in FIG. 6, a small plane "pqr" that is the closest to the Formant-frequency set s determined at step S1 is determined on the Formant frequency space. Further, at step S3, as shown in FIGS. 5 and 6, the Formant-frequency set s is projected onto the small plane "pqr" determined at step S2, thereby determining the Formant-frequency set s. After that, with reference to the space correspondence table stored in the space correspondence table memory 21, the expansion ratio S for the vocal-tract parameters $l_1$ and $l_2$ is determined by a linear function (Equation (5)) on the small plane "PQR" on the expansion ratio space of the corresponding vocal-tract parameters:

$$s' = \overline{pq} + a_1 \cdot \vec{v_1} + a_2 \cdot \vec{v_2}, \tag{4}$$

$$S = \overline{PQ} + A_1 \cdot \vec{V_1} + A_2 \cdot \vec{V_2}, \tag{5}$$

and $$\begin{bmatrix} a_1 / \|(q - \overline{pq})\| \\ a_2 / \|(r - \overline{pq})\| \end{bmatrix} = \begin{bmatrix} A_1 / \|(Q - \overline{PQ})\| \\ A_2 / \|(R - \overline{PQ})\| \end{bmatrix}. \tag{6}$$

In this case, the Equation (4) shows that the Formant frequency set s' after projection can be represented by a linear combination of the line segment "pq", the vector "$v_1$" and the vector "$v_2$". The Equation (5) shows that the Formant-frequency set S after conversion can be represented by a linear combination of the line segment "PQ", the vector "$V_1$" and the vector "$V_2$". The Equation (6) represents the correspondence between the small plane "pqr" on the Formant frequency space and the small plane "PQR" on the expansion ratio space of the vocal-tract parameters.

Further, at step S4, the vocal-tract parameters $l_1$ and $l_2$ of the standard speaker are multiplied by the expansion ratio S for the vocal-tract parameters $l_1$ and $l_2$ determined at step S3, respectively, so that vocal-tract parameters $l_1$ and $l_2$ of the target speaker are obtained, and then the obtained vocal-tract parameters $l_1$ and $l_2$ are outputted to the speaker model selector 12 via the buffer memory 7.

Next, the process executed by the speaker clustering processor 11 will be described. In the present preferred embodiment, with the use of speaker-to-speaker distances, clustering was performed below using an algorithm that has been used in the SPLIT method which has been already known to those skilled in the art. In this method, the distances across all the speakers are calculated in advance, and then, with reference to these results, each of the clusters each having the largest sum of speaker-to-speaker distances within the clusters is split into two clusters, sequentially. The SPLIT method differs from the general LBG algorithms in that each of the clusters each having the largest distortion is split into two clusters, sequentially. Therefore, any arbitrary number of speaker clusters can be generated by designating the total number of clusters as an ending condition for clustering.

In order for comparison of speaker clusters by various speaker-to-speaker distances, the speaker-to-speaker distance was determined by using the following four kinds of sets of parameters, and used for the clustering. Among the four sets of parameters, the vocal-tract parameters $l_1$ and $l_2$, and the vocal-tract length VTL are preferred embodiments according to the present invention, while the other two sets are comparative examples:

(1) vocal-tract parameters $l_1$ and $l_2$;
(2) vocal-tract length VTL=$l_1$+$l_2$;
(3) Formant frequencies of vowels /a/ and /i/ used in the estimation of the above (1) and (2); and
(4) distances between speaker-dependent HMMs.

For the above parameters sets (1), (2) and (3), Euclidean distances between the speakers' parameters are used. For the parameter set (4), the following speaker-to-speaker distance based on Bhattacharyya distance used in the apparatus of the Japanese Patent Laid-Open Publication No. 07-261785 is used. Prior to calculation of the speaker-to-speaker distance, first of all, using the Baum-Welch algorithm or a speaker adaptation method, speaker-dependent HMMs having the same structure are trained. The distance between two HMMs $M_1$ and $M_2$ each having the same structure is defined as shown by the following equation (7). In this case, without taking into consideration the HMM state transition probability and the like, the distance is defined as a distance d ($b_i^{(1)}$, $b_i^{(2)}$) between HMM output probabilities:

$$D(M_1, M_2) = (1/N) \sum_{i=1}^{N} d(b_i^{(1)}, b_i^{(2)}), \tag{7}$$

where $b_i^{(j)}$ represents an output probability distribution in a state "i" of HMM $M_j$, and N represents the number of states of HMM $M_j$. Also, with the output probability distribution given by a single Gaussian distribution, the distance d ($b_i^{(1)}$, $b_i^{(2)}$) between output probabilities is determined by the following equation (8) based on the Bhattacharyya distance:

$$d(b^{(1)}, b^{(2)}) = (1/8)(\mu_1 - \mu_2)^t [(\Sigma_1 + \Sigma_2)/2]^{-1} (\mu_1 - \mu_2) + \tag{8}$$

$$(1/2)\ln[|(\Sigma_1 + \Sigma_2)/2| / (|\Sigma_1|^{1/2} |\Sigma_2|^{1/2})],$$

where $\mu_j$ and $\Sigma_j$ represent the mean vector and the covariance matrix, respectively, of the HMM $M_j$.

In this case, a method based on the clustering algorithm used in the SPLIT method is used. In this method, unlike the common conventional LBG algorithm in which clusters of powers of 2 are prepared, each of the clusters each having the largest distortion is split into two clusters, sequentially. Accordingly, any number of clusters can be created. Also, an element-to-element distance table is prepared in advance before executing the clustering process. This offers such an advantageous effect that an initial value of the cluster centroid does not need to be given heuristically. Consequently, only a threshold value to the distance, or the number of clusters, needs to be given in advance, and merely giving this value allows a result to be obtained fully automatically.

The method for generating speaker clusters by using the above speaker clustering method is described. In this case, clusters are automatically created only by giving a final number K of clusters.

Figure 3:
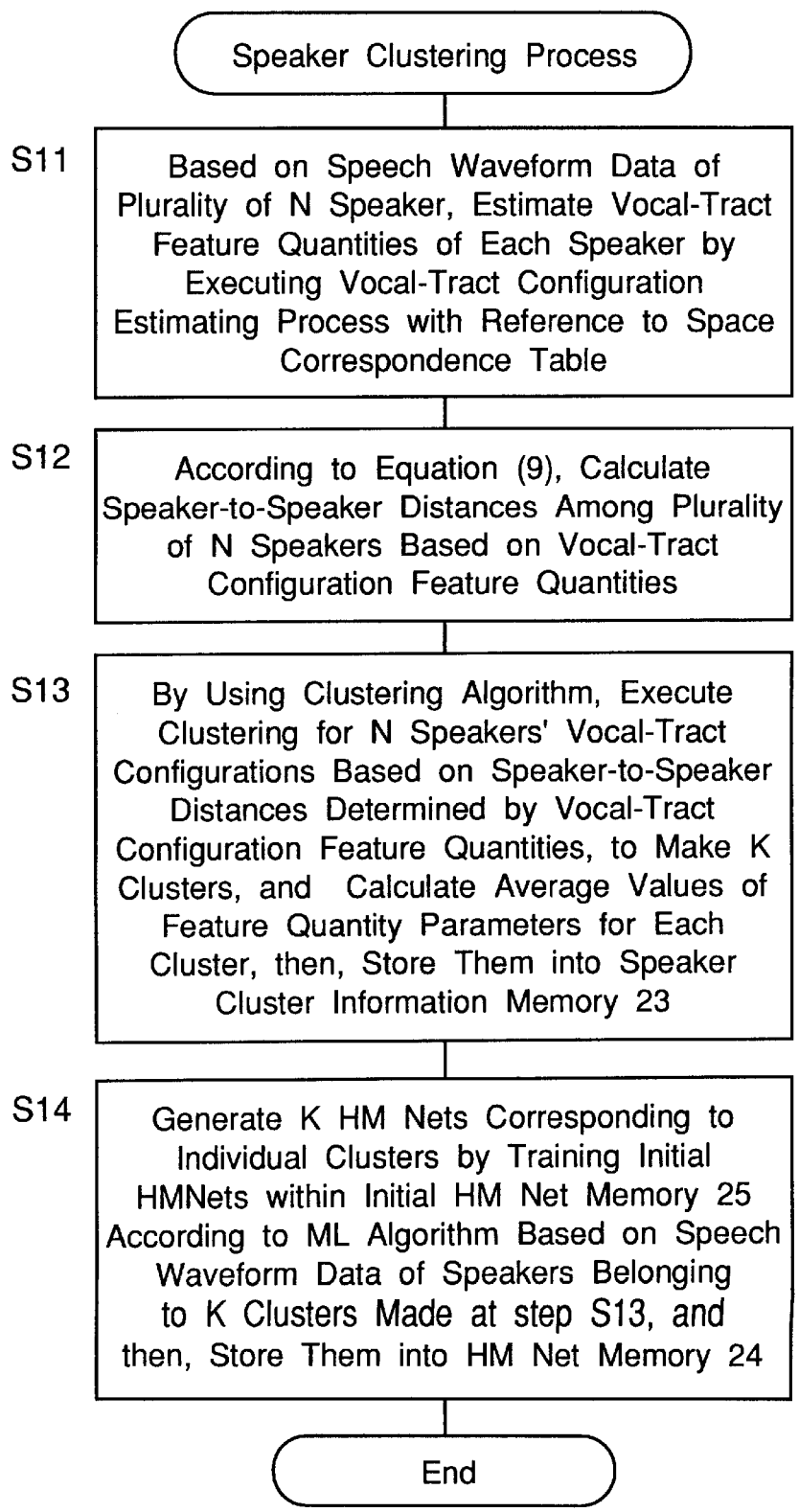
FIG. 3 is a flow chart showing a speaker clustering process which is executed by a speaker clustering processor 11 of FIG. 1.

FIG. 3 is a flow chart showing a speaker clustering process which is executed by the speaker clustering processor 11 of FIG. 1.

Referring to FIG. 3, first of all, at step S11, a vocal-tract configuration estimating process is executed with reference to the space correspondence table stored in the space correspondence table memory 21 from the speech data of the plurality of N speakers previously stored in the speech waveform data memory 22, in a manner similar to that of the case of the estimating method of the vocal-tract configuration estimator 10, and this leads to that the feature quantities of the vocal-tract configuration of the individual speakers are estimated. Next, at step S12, by using the following (9), the speaker-to-speaker distances between the plurality of N speakers are calculated based on the feature quantities of the vocal-tract configuration. In this process, assuming that a vector of the D-dimensional feature quantities of the vocal-tract configuration of a speaker $s_j$ is $P_j(i)$ as an example, then the distance $d(S_1, S_2)$ between two speakers $S_1$ and $S_2$ can be determined by the following equation (9) with the use of, for example, the Euclidean distance. In the present preferred embodiment, for example if the vocal-tract parameters $l_1$ and $l_2$ are used as the feature quantity of vocal-tract configuration, then D=2:

$$d(S_1, S_2) = \sum_{i=1}^{D} (P_1(i) - P_2(i))^2. \quad (9)$$

Next, at step S13, by using the clustering algorithm of the above-mentioned split method, the vocal-tract configurations of the plurality of N speakers are clustered based on the calculated speaker-to-speaker distances due to the feature quantities of the vocal-tract configuration, by which the plurality of K clusters are created, and average values of the feature quantity parameters of the individual clusters are computed or calculated. Thereafter, they are stored in the speaker cluster information memory 23. That is, for example, the average values of the vocal-tract parameters $l_1$ and $l_2$ or the vocal-tract lengths VTL are stored for each cluster of the K clusters in the speaker cluster information memory 23. Further, at step S14, K HM Nets corresponding to the individual K clusters are created or generated by training an initial HM Net stored in the initial HM Net memory 25 based on speech waveform data of speakers belonging to the K clusters obtained at step S13 (stored in the speech waveform data memory 22) and by using an ML training algorithm, and then, the created HM Nets are stored into the HM Net memory 24.

Further, the processes which are executed by the speaker model selector 12, the phoneme verifier 5 and the LR parser 6, that is, the speaker independent speech recognition method by speaker cluster models according to the present preferred embodiment will be described. In the present preferred embodiment, a speaker is, first of all, requested to utter speech needed to estimate the feature quantities of vocal-tract configuration, and an optimum speaker cluster is selected based on the uttered speech. The speaker independent speech recognition algorithm by this speaker clustering is carried out by the following steps:

<Step SS1>With the switch SW1 switched to the "b" side, the recognition-target speaker to be recognized is requested to utter predetermined speech (for example, vowels /a/ and /i/);

<Step SS2>The vocal-tract configuration estimator 10 estimates the vocal-tract configuration of the speaker from the inputted speech;

<Step SS3>The speaker model selector 12 selects a speaker model based on the vocal-tract configuration estimated by the vocal-tract configuration estimator 10, and the speaker cluster information stored in the speaker cluster information memory 23. The process at the above-mentioned steps SS1 to SS3 is referred to as speaker model selecting process; and <Step SS4>With the switch SW1 switched to the "a" side, speech recognition of the speech uttered by the speaker is performed using the HM Net of the speaker model selected at step SS3 by the phoneme verifier 5 and the LR parser 6. This process at step SS4 is referred to as speech recognition process.

Next, an SSS-LR (left-to-right rightmost type) speaker independent continuous speech recognition apparatus in the present preferred embodiment will be described. This apparatus adopts a phoneme environment dependent type, high-efficiency HMM representation form, called HM Net, stored in the HM Net memory 24. Also, in this SSS, with respect to a probability model representing the time-base transition of a speech parameter by stochastic transition between stochastic steady signal sources (states) assigned on the phoneme feature space, the operation of splitting those individual states in a direction of context or time is iterated based on the criterion of likelihood maximization, by which model refinement into higher precision is executed in a sequential fashion.

In the speech recognition process of the speech recognition apparatus of FIG. 1, uttered speech of a speaker is inputted to the microphone 1, which then converts the inputted uttered speech into a speech signal, and then the speech signal is subjected to A/D conversion so as to be converted into a digital speech signal by the A/D converter 2. The digital speech signal is inputted to a feature extractor or feature extracting section 3 via the "a" side of the switch SW1. The feature extractor 3 executes, for example, an LPC analysis on the inputted digital speech signal, thereby extracting 34-dimensional feature parameters including a log power, 16-order cepstrum coefficients, a δ log power, and 16-order δ cepstrum coefficients. A time series of the extracted feature parameters is inputted to the phoneme verifier 5 via the buffer memory 4.

The HM Net stored in the HM Net memory 24 connected to the phoneme verifier 5 is represented as a plurality of networks taking each state as a node, and each state has the following information:

(a) state number;

(b) acceptable context class;

(c) preceding-state and succeeding-state list;

(d) parameter of output probability density distribution; and (e) self transition probability and succeeding-state transition probability.

The output probability density function in this case is a mixed Gaussian distribution having a 34-dimensional diagonal covariance matrix, and each distribution has been trained by using samples of a specific speaker. Also, a predetermined context-free grammar (CFG) stored in the context-free grammar memory (CFG memory) 9 is automatically transformed into an LR table by a method which has been already known to those skilled in the art, and the transformed LR table is stored in an LR table memory 8.

Within a speaker cluster information memory 33 connected to the speaker model selector 12, the feature quantities of the standard vocal-tract configuration of speakers within each speaker cluster are stored in advance. As the standard feature quantities, the average values of the feature quantities of the vocal-tract configuration of the speakers within each cluster and the like are available. Also, the standard vocal-tract configurations within the individual speaker clusters and the HM Nets stored in the HM Net memory 24 are in a form of one-to-one correspondence.

In the speaker model selecting process, the vocal-tract configuration estimator 10 estimates the vocal-tract configuration of the speaker based on the inputted digital speech signal. The speaker model selector 12 compares the standard vocal-tract configuration of each speaker cluster stored in the speaker cluster information memory 33 with the vocal-tract configuration of the speaker estimated by the vocal-tract configuration estimator 10, and selects a speaker cluster that has the closest vocal-tract configuration (for example, vocal-tract parameters $l_1$ and $l_2$ or vocal-tract length VTL). Then, the speaker model selector 12 outputs a selection signal showing a speaker cluster of the selected speaker cluster model (HM Net) to the HM Net memory 24, thereby designating the HM Net of the speaker cluster model to be used by the phoneme verifier 5 (hereinafter, referred to as designated speaker model).

Then, in the speech recognition process, the phoneme verifier 5 executes a phoneme verifying or checking process in response to a phoneme verification request from the phoneme-context dependent type LR parser 6. In this process, the LR parser 6 delivers to the phoneme verifier 5 phoneme context information comprising a phoneme verification section, a verification-target phoneme and its preceding and succeeding phonemes. Based on the delivered phoneme context information, the phoneme verifier 5 calculates the likelihood for data within the phoneme verification section by using the designated speaker model, and this likelihood value is returned to the LR parser 6 as a phoneme verification score. In response to this, the LR parser 6 processes the inputted phoneme prediction data from left to right without turning back, with reference to the LR table stored in the LR table memory B. If there is a syntactic ambiguity, analyses for all the candidates are processed in parallel with the stack split. The LR parser 6 predicts the next-coming phoneme from the LR table, and outputs the phoneme prediction data to the phoneme verifier 5. In response to this, the phoneme verifier 5 makes a verification with reference to the information stored in the HM Net memory 24 related to the designated speaker model corresponding to the phoneme, returns its likelihood to the LR parser 6 as a phoneme recognition score, thereby concatenating the phonemes one after another and achieving the continuous speech recognition. In this process, if a plurality of phonemes are predicted, all of these are checked for their presence, where a high-speed process is achieved by performing a pruning that partial trees of high partial speech recognition likelihoods are left or made to remain by a beam search method. After the inputted speaker speech has completely been processed, one recognition result or data having the maximum total likelihood or ones having a predetermined plurality of highest orders are outputted to an external equipment as recognition result data of the present speech recognition apparatus.

In the above-described preferred embodiment, the feature extractor 3, the phoneme verifier 5, the LR parser 6, the vocal-tract configuration estimator 10, the speaker clustering processor 11 and the speaker model selector 12 are implemented by, for example, a digital computer. Further, the buffer memories 4 and 7, the space correspondence table memory 21, the speech waveform data memory 22, the speaker cluster information memory 23, the HM Net memory 24, the LR table memory 8, the CFG memory 9 and the initial HM Net memory 25 are implemented by, for example, storage unit such as hard disk memory.

As described above, according to the preferred embodiment of the present invention, by virtue of the provision of the vocal-tract configuration estimator 10, the speaker clustering processor 11 and the speaker model selector 12, the feature quantities of the vocal-tract configuration of each speaker can be estimated from a small amount of speech of two vowels or the like. Thus, a speaker cluster model can be built from a small amount of speech waveform data. Further, in the process of speech recognition, a speaker cluster model can be selected based on a small amount of speech waveform data, so that high-speed speaker adaptation is achieved. Further, when speech recognition is performed by using HMMs speaker-clustered with a small amount of speech waveform data, there can be obtained a speech recognition rate higher than that of the prior art.

SECOND PREFERRED EMBODIMENT

FIG. 14 is a block diagram showing a constitution of a speech recognition apparatus of the second preferred embodiment according to the present invention, and in FIG. 14, the same components as those shown in FIG. 1 are designated by the same numeral references shown in FIG. 1.

As is apparent from comparison between FIGS. 1 and 14, the second preferred embodiment differs from the speech recognition apparatus of the first preferred embodiment shown in FIG. 1 at the following points:

(a) the switch SW1 is fixed on the "a" side, and switch SW1 is omitted;

(b) the vocal-tract configuration estimator 10 and the buffer memory 7 are omitted;

(c) the feature parameters outputted from the feature extractor 3 are inputted also via the buffer memory 4 to a speaker model selector 12a which replaces the speaker model selector 12 of FIG. 1; and (d) a series of speech-recognized phonemes when speech-recognizing speech of the inputted uttered speech signal with reference to a speaker independent HM Net stored in a newly added HM Net memory 24a is fed back from the LR parser 6 to the speaker model selector 12a.

In the second preferred embodiment, speaker adaptation without a teacher or training signal is performed with evaluation data of only one speech utterance. The algorithm for the speaker independent speech recognition method by this speaker clustering includes the following steps:

<Step SSS1>The phoneme verifier 5 and the LR parser 6 recognize inputted speech by using a predetermined speaker independent phoneme HMM stored in the memory 24a. Hereinafter, the speech recognition in this step is referred to as a first speech recognition process;

<Step SSS2>A series of speech-recognized phonemes is fed back from the LR parser 6 to the speaker model selector 12a, and the speaker model selector 12a selects a speaker phoneme model from HM Nets stored in the HM Net memory 24 in response to the inputted speech used in the step SSS1 and a series of fed-back phonemes; and <Step SSS3>Then, the phoneme verifier 5 and the LR parser 6 perform one more speech recognition on the inputted speech by using the selected phoneme model, and outputs the resultant data. Hereinafter, the speech recognition in this step is referred to as a second speech recognition process.

As described above, a final speech recognition result is established over the two speech recognition processes consisting of the above first and second speech recognition processes. In order to improve the speech recognition rate by the speech recognition method of the first preferred embodiment, there is a need of improving the recognition rate for mis-recognized data. For this purpose, there is such an essential problem that the training needs to be forwarded in the correct direction even if an erroneous recognition result is fed back. However, the speech recognition result data has been corrected to some extent by grammatical or other knowledge, and moreover, it is noted that all the phoneme series are not erroneous, but that the speech recognition result data is only erroneous when evaluated in terms of phrases. By actually checking data of speech recognition errors, the errors are often found only in the part of particles. From this fact, it can be considered that speaker adaptation is enabled enough even with feedback of mis-recognition results.

In the first speech recognition process, the phoneme verifier 5 executes a phoneme verifying process in response to a phoneme verification request from the phoneme-context dependent type LR parser 6. Then, the likelihood corresponding to data within the phoneme verification section is calculated by using, for example, the speaker independent phoneme model (HMM) stored in the HM Net memory 24$a$, and the resultant likelihood value is returned to the LR parser 6 as a phoneme verification score. The model used in this process is equivalent to the HMM, and therefore a forward-path algorithm that has been used for common HMMs is used for the calculation of likelihood. The LR parser 6 processes the inputted phoneme prediction data from left to right without turning back, with reference to the LR table 8. If there is a syntactic ambiguity, analyses for all the candidates are processed in parallel with the stack split. The LR parser 6 predicts the next-coming phoneme from the LR table stored in the LR table memory 8, and outputs the phoneme prediction data to the phoneme verifier 5. In response to this, the phoneme verifier 5 makes a verification with reference to the information stored in the HM Net memory 24 corresponding to the phoneme, returns its likelihood to the LR parser 6 as a phoneme recognition score, thereby concatenating the phonemes one after another and achieving the continuous speech recognition, and feeds back and outputs the speech recognition result data to the speaker model selector 12$a$. In this continuous speech recognition, if a plurality of phonemes are predicted, all of these are checked for their presence, where a high-speed process is achieved by performing a pruning that partial trees of high partial speech recognition likelihoods are left by a beam search method.

Next, in response to this, based on the feature parameter data inputted from the buffer memory 4 and the speech recognition result data or a series of speech-recognized phonemes fed back from the LR parser 6 in the first speech recognition process, the speaker model selector 12$a$ performs the following processes. Namely, the speaker model selector 12$a$ recognizes the speech of the inputted uttered speech signal, respectively, with reference to the HMMs of the speaker clusters stored in the HM Net memory 24 based on the feature parameters from the feature extractor 3 by inputting a series of speech-recognized phonemes into the HMMs, thereby calculating likelihoods corresponding to the HMMs of the speaker clusters stored in the HM Net memory 24. Then the speaker model selector 12$a$ selects at least one HMM having the largest likelihood from the HMMs of the HM Net memory 24. In other words, the speaker model selector 12$a$ selects a speaker cluster model having the maximum likelihood from the speaker cluster models stored in the HM Net memory 24. Then, the speaker model selector 12$a$ outputs a selection signal showing a speaker cluster of the selected speaker cluster model to the HM Net memory 24, thus designating a speaker cluster model to be used in the phoneme verifier 5 (hereinafter, referred to as designated speaker model).

Then, in the second speech recognition process, the phoneme verifier 5 execute a phoneme verifying process in response to a phoneme verification request from the phoneme-context dependent type LR parser 6. In this process, the LR parser 6 delivers to the phoneme verifier 5 phoneme context information comprising a phoneme verification section, a verification-target phoneme and its preceding and succeeding phonemes. Based on the delivered phoneme context information, the phoneme verifier 5 calculates the likelihood for data within the phoneme verification section by using the designated speaker model, and this likelihood value is returned to the LR parser 6 as a phoneme verification score. In response to this, the LR parser 6 processes the inputted phoneme prediction data from left to right without turning back, with reference to the LR table 8. If there is a syntactic ambiguity, analyses for all the candidates are processed in parallel with the stack split. The LR parser 6 predicts the next-coming phoneme from the LR table stored in the LR table memory 8, and outputs the phoneme prediction data to the phoneme verifier 5. In response to this, the phoneme verifier 5 makes a verification with reference to the information stored in the HM Net memory 24 related to the designated speaker model corresponding to the phoneme, returns its likelihood to the LR parser 6 as a phoneme recognition score, thereby concatenating the phonemes one after another and achieving the continuous speech recognition. In this process, as in the first speech recognition process, if a plurality of phonemes are predicted, all of these are checked for their presence, where a high-speed process is achieved by performing a pruning so that partial trees of high partial speech recognition likelihoods are left by a beam search method. After the inputted speaker's speech has completely been processed, one having the maximum total likelihood or ones of a predetermined plurality of highest orders are outputted to external equipment as recognition result data of the apparatus.

EXPERIMENTAL EXAMPLES

Figure 7:
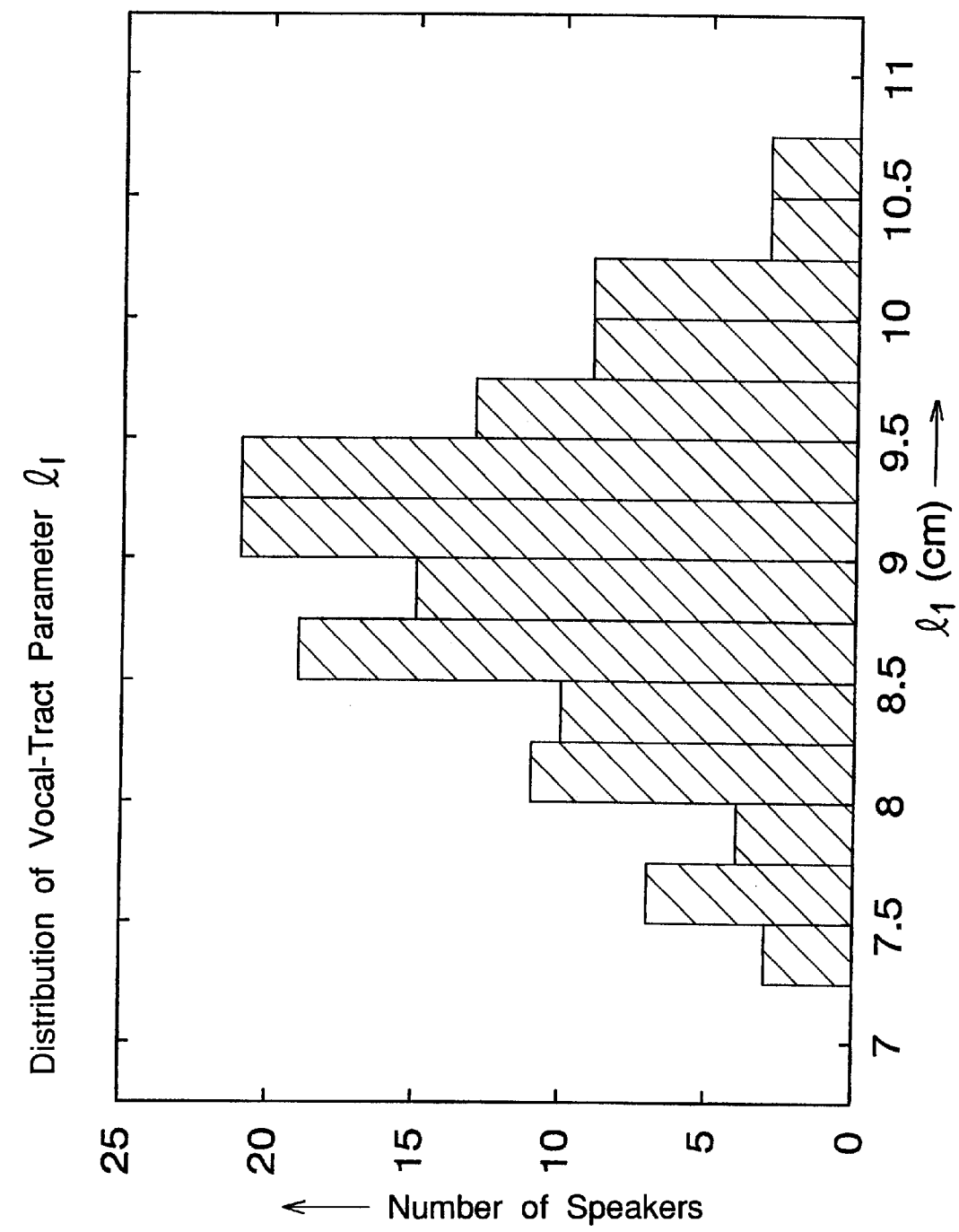
FIG. 7 is a graph showing a distribution of a vocal-tract parameter $l_1$.
Figure 8:
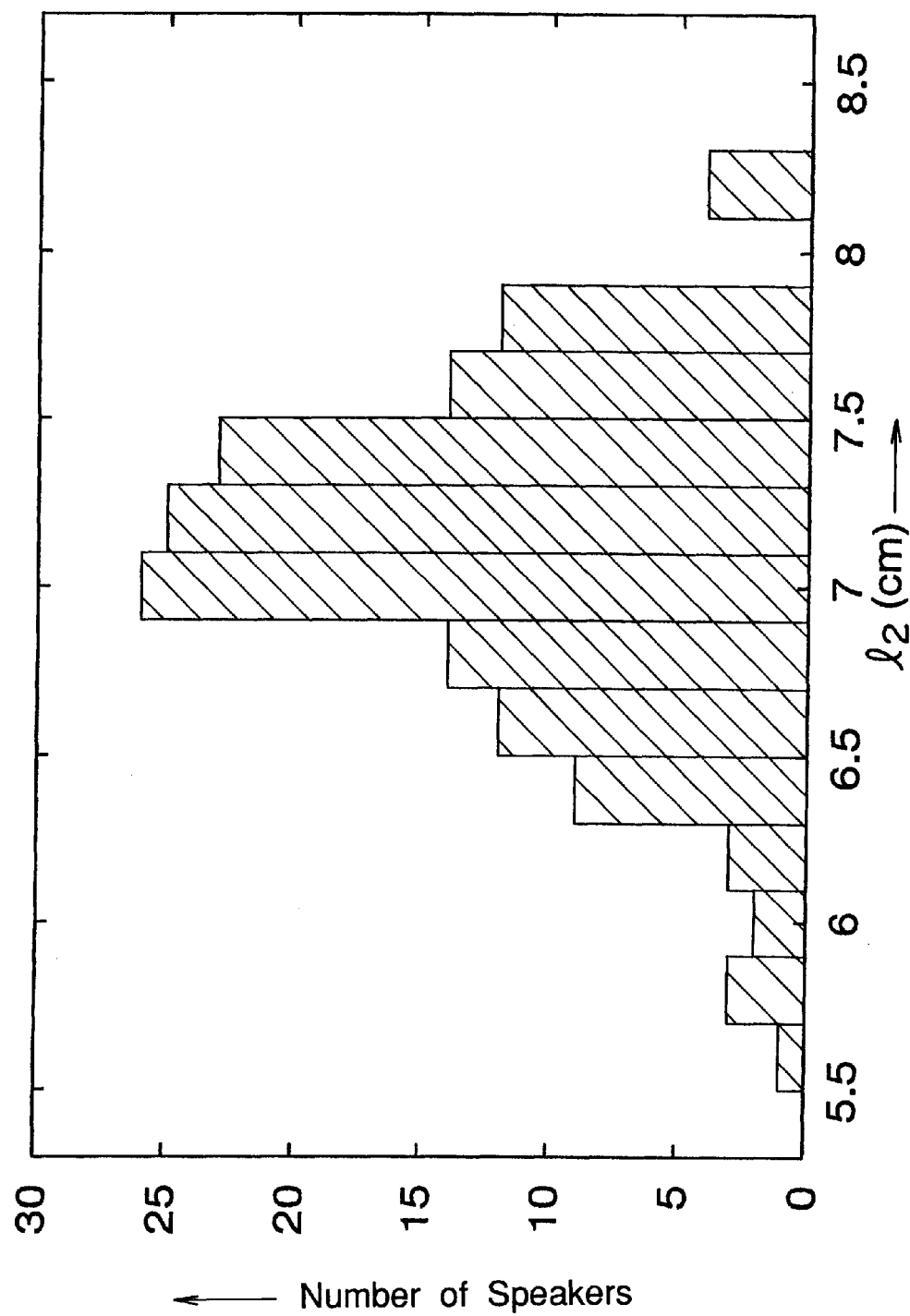
FIG. 8 is a graph showing a distribution of a vocal-tract parameter $l_2$.
Figure 9:
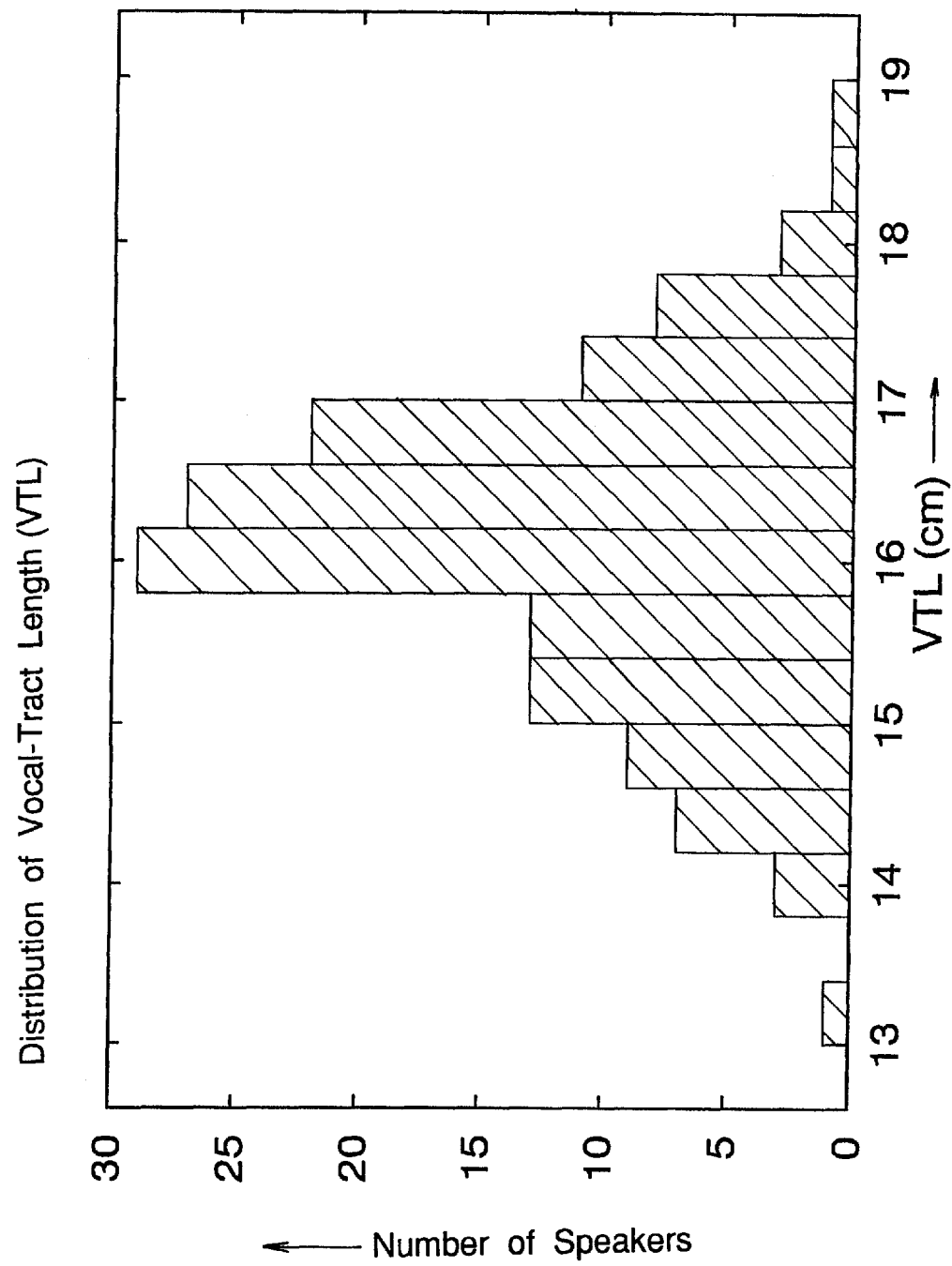
FIG. 9 is a graph showing a distribution of a vocal-tract length VTL.

The present inventor conducted the following experiment in order to establish the functional effects of the above-described speech recognition apparatus of the first preferred embodiment. A total of 148 male speakers were clustered based on the above-described speaker-to-speaker distance. First of all, distributions of the vocal-tract length $l_1$ on the oral cavity side, the length $l_2$ on the pharyngeal cavity side, and the vocal-tract length VTL ($=l_1+l_2$) of the speakers estimated by the above-described method of vocal-tract configuration estimating process are shown in FIGS. 7, 8 and 9, respectively. In the calculation of Formant frequencies of vowels /a/ and /i/, which are required for the estimation of the vocal-tract parameters, two words, "b-a-a-i" and "f-a-m-i-r-i-i", which are included in a phonetically balanced sentence A among the speech database Cset of the present applicant, were used and average values of Formant frequencies of centroid 50% in each vowel interval were used. Average values of the individual vocal-tract parameters estimated under these conditions are $l_1$=9.01 cm, $l_2$=7.10 cm, and VTL=16.11 cm, showing smooth distributions in each parameter as apparent from FIGS. 7 to 9.

In the present experiment, 148 speakers were divided into 3, 5, 10, 20 and 40 clusters. It is noted that the training of speaker-dependent HMMs, which are required for the calculation of Bhattacharyya distances, was executed under the conditions of the following Table 1. For all the speaker dependent HMMs, 200-state single-model Gaussian HM Nets having the same structure was trained with the Baum-Welch algorithm by using fifty sentences of the phonetically balanced sentence A among the speech database Cset possessed by the present applicant. It is noted that because the amount of speech data used for the training is insufficient, restrictions have been added so that the variance would not become smaller than the initial model in the training process, in order to prevent the value of variance of output probability distribution from becoming extremely small by the training.

TABLE 1

Speaker dependent HMN training conditions used for calculation of distances between HMMs Analysis conditions:

| | |
|---|---|
| Sampling freguency: | 12 kHz |
| 20 ms Hamming window Frame period: | 5 ms |
| Acoustic parameters: | 16-order LPC Cepstrum + 16-order Δ cepstrum + Δ log power |

Training conditions:

| | |
|---|---|
| Training data: | fifty sentences of phonetically balanced sentence set A among the speech database Cset possessed by the applicant; |
| HMM structure: | 200-state, single mixed HM Net |
| Training method: | Training by Baum-Welch algorithm, controlled so that variance will not become smaller than before the training |
| Initial model: | Speaker dependent model (MHT) |

Figure 10:
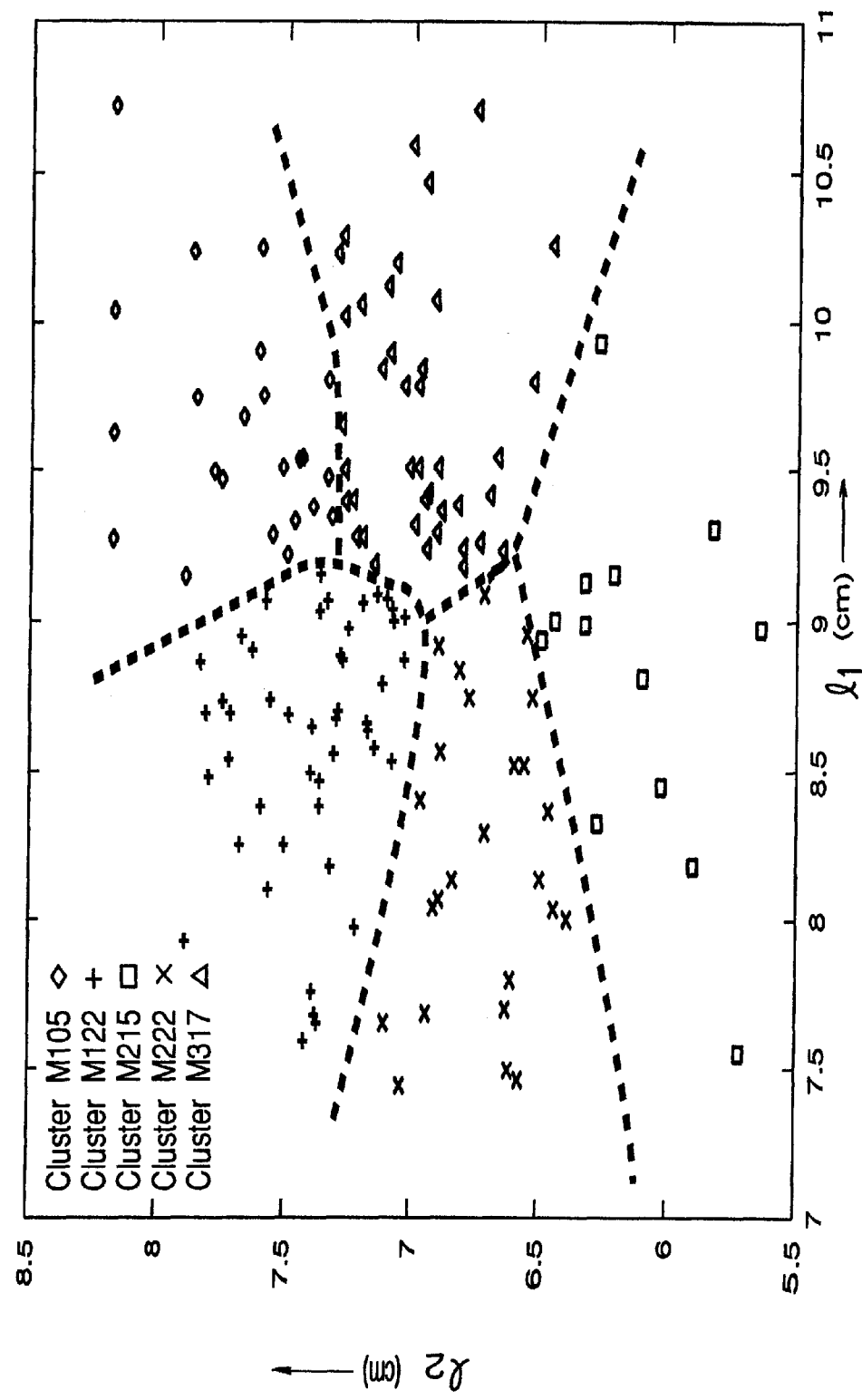
FIG. 10 is a graph showing one example of speaker clusters based on the vocal-tract parameters $l_1$ and $l_2$.
Figure 11:
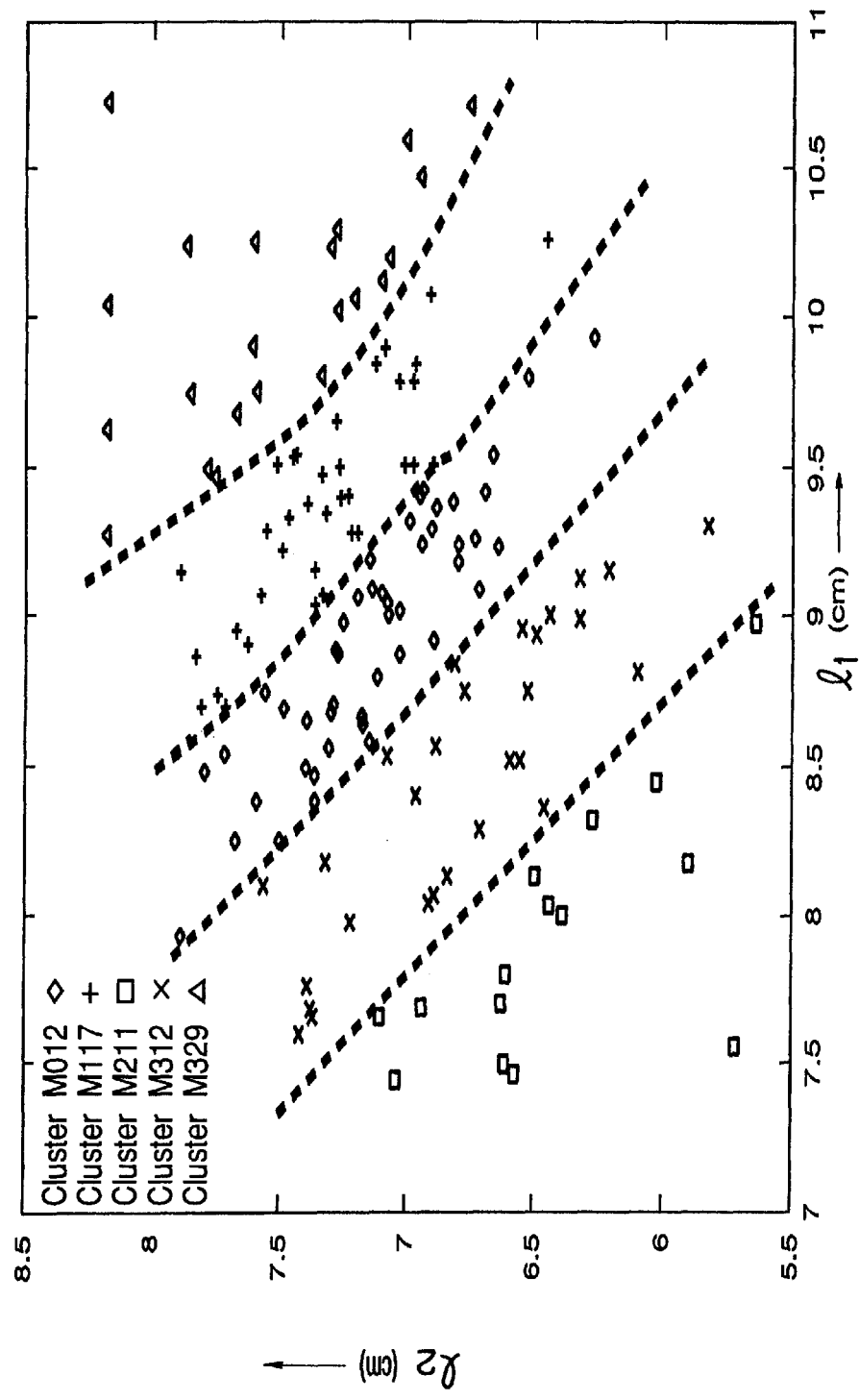
FIG. 11 is a graph showing one example of speaker clusters based on the vocal-tract length VTL.
Figure 12:
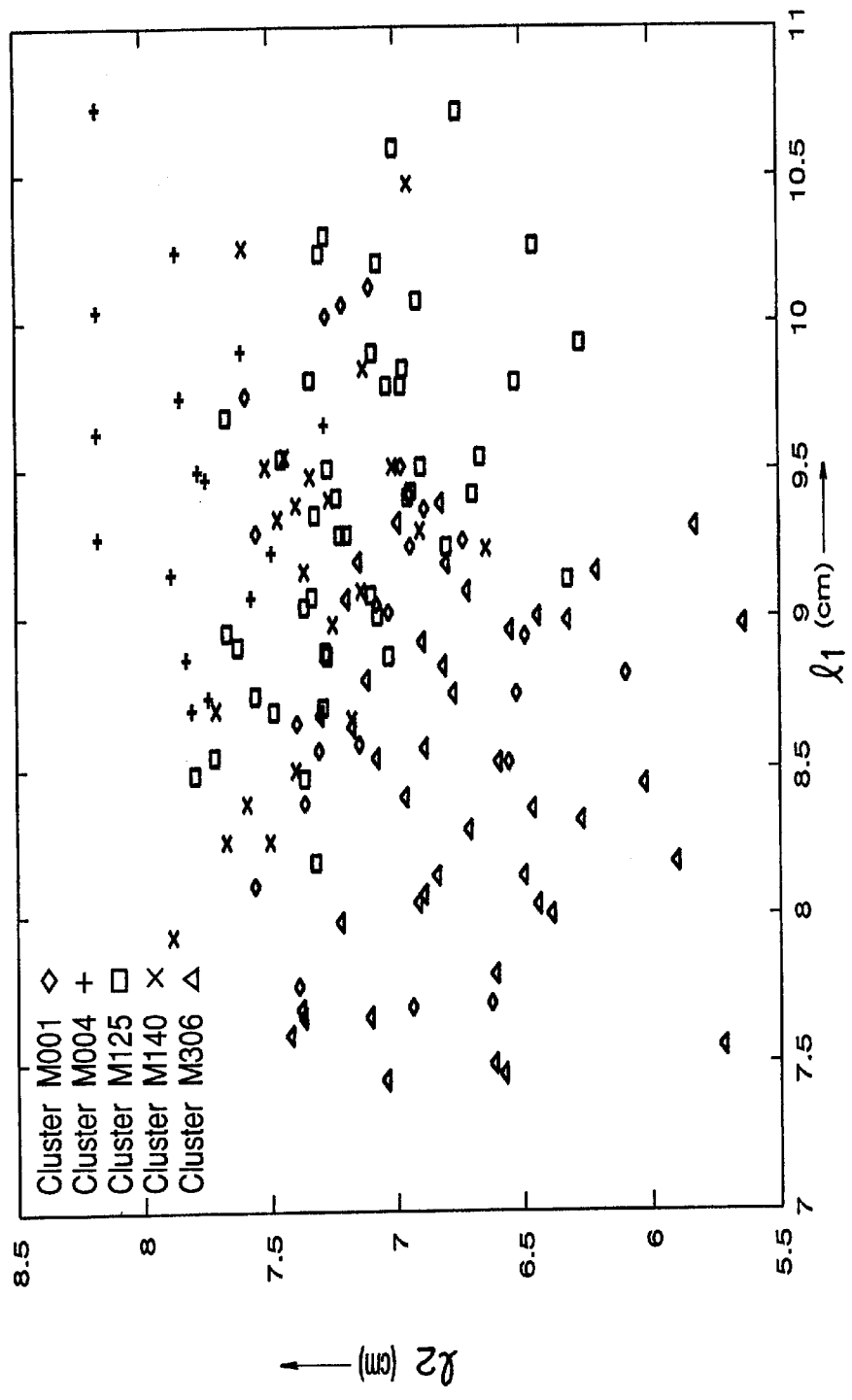
FIG. 12 is a graph showing one example of speaker clusters based on the Formant frequency.
Figure 13:
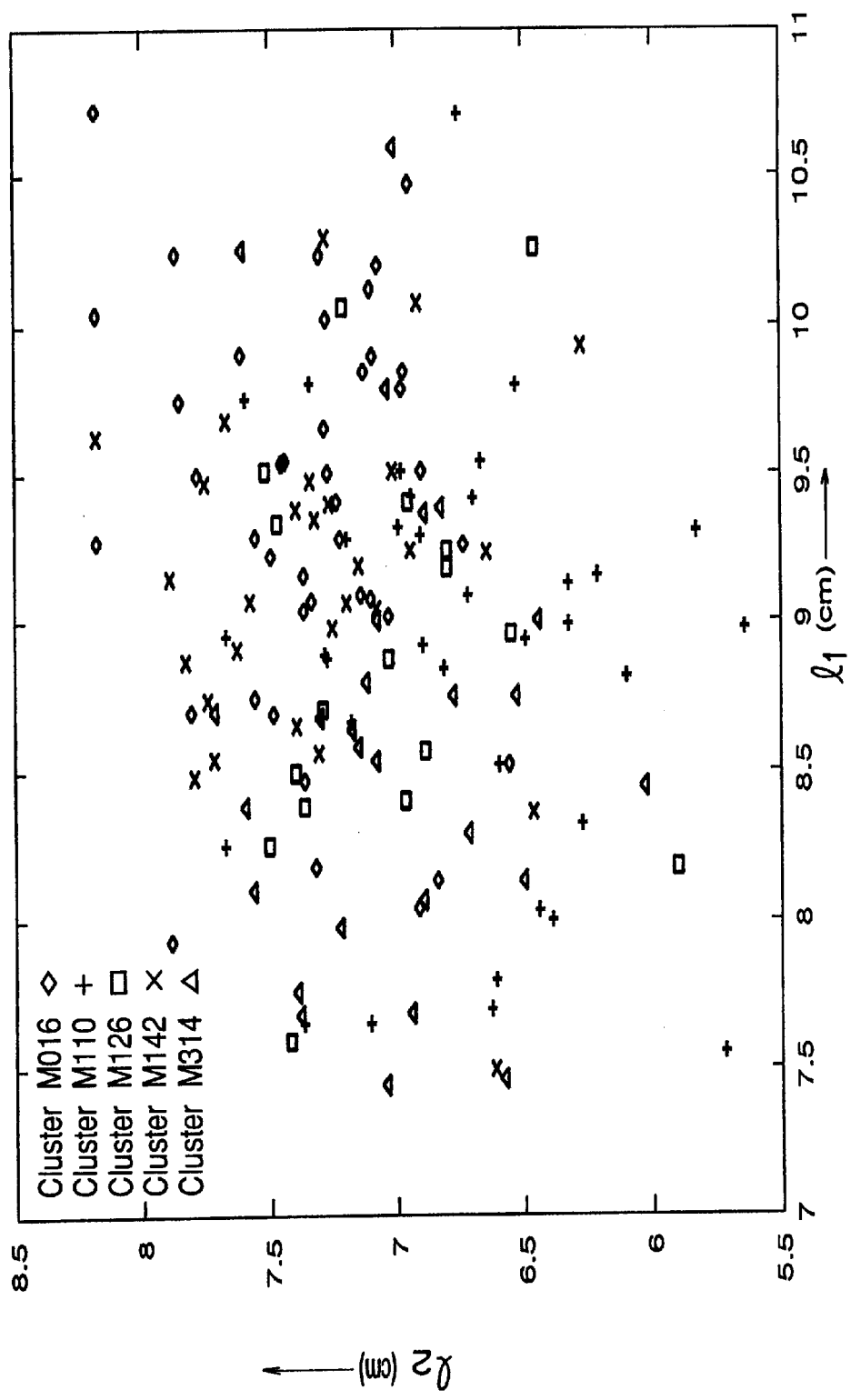
FIG. 13 is a graph showing one example of speaker clusters based on distances between HMMs.

The results of division or split into five clusters by using four types of speaker-to-speaker distances, i.e., (1) vocal-tract parameters $l_1$ and $l_2$;

(2) vocal-tract length $VTL=l_1+l_2$;

(3) Formant frequencies of vowels /a/ and /i/; and (4) distances between speaker dependent HMMs are shown in FIGS. 10, 11 and 12, respectively. The symbols in these figures represent vocal-tract parameters $l_1$ and $l_2$ of different speakers, respectively, and distributions of individual classes are on the ($l_1$, $l_2$) space are represented by representing speakers belonging to the same cluster by the same symbol.

As is apparent from FIGS. 10 to 13, generated clusters increase in size with the speaker-to-speaker distance used. In the case of clusters obtained by using the vocal-tract parameters $l_1$ and $l_2$ or the distances between the vocal-tract lengths VTL, the space in which clustering was done and the space in which clustering results are shown in the figures are equal to each other or intensely correlated with each other, so that clear clusters can be observed (See FIGS. 10 and 11). Also, in the case of clusters based on the Formant frequencies (FIG. 12), clusters were formed in regions of smaller and larger values of $VTL=l_1$ and $l_2$ on the ($l_1$, $l_2$) space, where a tendency similar to the clustering using vocal-tract length was seen, tough slightly. However, in the case of using the distances between speaker dependent HMMs (FIG. 13), there could be seen almost no correlation between the obtained clusters and the ($l_1$, $l_2$) space.

Next, in order to evaluate the clustering method of the present preferred embodiment, speech recognition experiments were conducted by using the speaker cluster HMMs prepared based on the clustering results by various distances between speakers. The experimental conditions are listed in the following Table 2. In the experiment, for each of six target speakers, speaker clusters were selected on a likelihood criterion (speaker model selection of the modification example) with seven phrases in the speech database Aset SB1 task possessed by the present applicant, and then with the selected speaker cluster HMMs, 249 phrases (1963 phonemes) in the SB1 task were recognized by a phonemic typewriter.

Recognition Experiment Conditions By Speaker Cluster HMMs

Analysis conditions:

| | |
|---|---|
| Sampling frequency: | 12 kHz |
| 20 ms Hamming window Frame period: | 5 ms |
| Acoustic parameters: | 16-order LPC Cepstrum + 16-order Δ cepstrum + Δ log power |
| Acoustic parameters: | 16-order LPC Cepstrum + 16-order Δ cepstrum + Δ log power |

Training conditions for speaker cluster HMMs

| | |
|---|---|
| Training data: | speech waveform data of speakers belonging to each speaker cluster fifty sentences of phonetically balanced sentence set A per speaker; |
| HMM structure: | 200-state, single mixed HM Net + one-state, ten mixed silent model |
| Training method: | Training by Baum-Welch algorithm, controlled so that variance will not become smaller than before the training |
| Initial model: | speaker independent gender model (trained with 148 speakers) |

Speaker cluster selection and Recognition target data:

| | |
|---|---|
| Recognition target speakers: | gender six speakers (MAU, MMS, MNM, MTM, MTT, MXM) |
| Cluster selection: | seven phrases (SB1 task) |
| Recognition data: | 249 phrases (SB1 task) Recognized by phonemic typewriter |

Phoneme recognition rates obtained by the experiment are shown in the following Table 3. Table 3 lists recognition rates obtained with speaker cluster HMMs based on the results of division into 3, 5, 10, 20 and 40 clusters by using the following parameters as the speaker-to-speaker distances:

(1) vocal-tract parameters $l_1$ and $l_2$;

(2) vocal-tract length VTL;

(3) Formant frequencies of vowels /a/ and /i/; and (4) distances between speaker dependent HMMs.

For comparison's sake, recognition results by male models (GD) are listed together.

TABLE 3

| Clustering | | Number of clusters | | | | |
|---|---|---|---|---|---|---|
| Scale | GD | 3 | 5 | 10 | 20 | 40 |
| $l_1$ and $l_2$ | 66.5 | 67.7 | 68.4 | 68.3 | 68.0 | 67.5 |
| VTL | — | 67.7 | 67.5 | 68.0 | 67.2 | 66.7 |
| Formant | — | 67.8 | 67.4 | 67.8 | 67.4 | 66.2 |
| Plural HMNs | — | 67.9 | 67.0 | 66.6 | 66.9 | 66.2 |

(Notes) GD is a speech recognition rate by male models.

As is apparent from Table 3, in distance between s peakers, decrease in the recognition rate due to decrease in the model robustness can be seen when clusters are split excessively. On the other hand, with appropriate numbers of speaker clusters selected, speaker cluster HMMs of five clusters showed the highest recognition performance, where mis-recognitions were reduced by 5.7%. Speaker cluster HMMs obtained by vocal-tract length followed that.

As a result of conducting speaker clustering with this vocal-tract parameter, the configuration of generated speaker clusters largely differed from the configuration of clusters obtained based on the acoustic distance scale, and besides improvement in the recognition performance of speaker cluster models was seen. In the present preferred embodiment, it is enabled to perform speaker clustering based on small amounts of speech waveform data, and to derive similarities of vocal-tract configurations against the generated speaker clusters.

Accordingly, according to the present preferred embodiments of the present invention, the feature quantities of the speakers' vocal-tract configuration can be estimated from a small amount of two vowels or the like, allowing a speaker cluster model to be built with a small amount of speech data. Also, in the process of speech recognition, a speaker cluster model can be selected based on a small amount of speech waveform data, allowing high-speed speaker adaptation to be realized. Further, when speech recognition is performed with HMMs speaker-clustered by using a small amount of speech waveform data, there can be obtained a speech recognition rate higher than that of the prior art.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A speaker clustering apparatus comprising:

a first storage unit for storing speech waveform data of a plurality of N speakers;

a first estimator for estimating feature quantities of vocal-tract configurations, each being an anatomical configuration of a vocal tract of each speaker, with reference to correspondence between vocal-tract configuration parameters and Formant frequencies being predetermined from a predetermined vocal tract model of a standard speaker, based on the speech waveform data of the plurality of N speakers stored in said first storage unit; and a clustering processor for calculating speaker-to-speaker distances between the N speakers based on the feature quantities of the vocal-tract configurations of the N speakers estimated by said first estimator, and clustering the N speakers using a predetermined clustering algorithm based on the calculated speaker-to-speaker distances, thereby generating a predetermined plurality of K clusters, and for training a predetermined initial hidden Markov model using a predetermined training algorithm based on the speech waveform data of speakers respectively belonging to the generated K clusters, which is stored in said first storage unit, thereby generating a plurality of K hidden Markov models corresponding to the plurality of K clusters.

2. The speaker clustering apparatus as claimed in claim 1, wherein the feature quantities of the vocal-tract configuration include a first length on an oral cavity side of a vocal tract of a speaker, and a second length on a pharyngeal cavity side of the speaker.

3. The speaker clustering apparatus as claimed in claim 1, wherein the feature quantities of the vocal-tract configuration include vocal-tract lengths of speakers.

4. A speech recognition apparatus comprising:

a first storage unit for storing speech waveform data of a plurality of N speakers;

a first estimator for estimating feature quantities of vocal-tract configurations, each being an anatomical configuration of a vocal tract of each speaker, with reference to correspondence between vocal-tract configuration parameters and Formant frequencies being predetermined from a predetermined vocal tract model of a standard speaker, based on the speech waveform data of the plurality of N speakers stored in said first storage unit;

a clustering processor for calculating speaker-to-speaker distances between the N speakers based on the feature quantities of the vocal-tract configurations of the N speakers estimated by said first estimator, and clustering the N speakers using a predetermined clustering algorithm based on the calculated speaker-to-speaker distances, thereby generating a predetermined plurality of K clusters, and for training a predetermined initial hidden Markov model using a predetermined training algorithm based on the speech waveform data of speakers respectively belonging to the generated K clusters, which is stored in said first storage unit, thereby generating a plurality of K hidden Markov models corresponding to the plurality of K clusters;

a second storage unit for storing the plurality of K hidden Markov models generated by said clustering processor;

a third storage unit for storing information of feature quantities of the vocal-tract configurations of speaker clusters belonging to the plurality of K hidden Markov models stored in said second storage unit;

a second estimator for estimating feature quantities of vocal-tract configurations of a recognition-target speaker with reference to said predetermined correspondence between the vocal-tract configuration parameters and the Formant frequencies, based on an inputted uttered speech signal of the recognition-target speaker;

a speaker model selector for selecting at least one hidden Markov model having feature quantities of a vocal-tract configuration of a speaker cluster closest to feature quantities of a vocal-tract configuration of the recognition-target speaker from the plurality of K hidden Markov models stored in said second storage unit by comparing the feature quantities of the vocal-tract configuration of the recognition-target speaker estimated by said second estimator with the information of the vocal-tract configurations of the speaker clusters stored in said third storage unit; and a speech recognition unit for recognizing speech of the inputted uttered speech signal of the recognition-target speaker with reference to the hidden Markov model selected by said speaker model selector, and outputting speech recognition data.

5. The speaker clustering apparatus as claimed in claim 4, wherein the feature quantities of the vocal-tract configuration include a first length on an oral cavity side of a vocal tract of a speaker, and a second length on a pharyngeal cavity side of the speaker.

6. The speaker clustering apparatus as claimed in claim 4, wherein the feature quantities of the vocal-tract configuration include vocal-tract lengths of speakers.

7. A speech recognition apparatus comprising:

a first storage unit for storing speech waveform data of a plurality of N speakers;

a first estimator for estimating feature quantities of vocal-tract configurations, each being an anatomical configuration of a vocal tract of each speaker, with reference to correspondence between vocal-tract configuration parameters and Formant frequencies being predetermined from a predetermined vocal tract model of a standard speaker, based on the speech waveform data of the plurality of N speakers stored in said first storage unit;

a clustering processor for calculating speaker-to-speaker distances between the N speakers based on the feature quantities of the vocal-tract configurations of the N speakers estimated by said first estimator, and clustering the N speakers using a predetermined clustering algorithm based on the calculated speaker-to-speaker distances, thereby generating a predetermined plurality of K clusters, and for training a predetermined initial hidden Markov model using a predetermined training algorithm based on the speech waveform data of speakers respectively belonging to the generated K clusters, which is stored in said first storage unit, thereby generating a plurality of K hidden Markov models corresponding to the plurality of K clusters;

a second storage unit for storing the plurality of K hidden Markov models generated by said clustering processor;

a first speech recognition unit for recognizing speech of an inputted uttered speech signal of a recognition-target speaker with reference to a predetermined speaker independent phonemic hidden Markov model, and outputting a series of speech-recognized phonemes;

a speaker model selector for recognizing the speech of the inputted uttered speech signal, respectively, with reference to the plurality of K hidden Markov models stored in said second storage unit, based on the sequence of speech-recognized phonemes outputted from said first speech recognition unit, thereby calculating K likelihoods corresponding to the K hidden Markov models, and for selecting at least one hidden Markov model having the relatively largest likelihood from the K hidden Markov models; and a second speech recognition unit for recognizing the speech of the inputted uttered speech signal with reference to the hidden Markov model selected by said speaker model selector, and outputting speech recognition data.

8. The speaker clustering apparatus as claimed in claim 7, wherein the feature quantities of the vocal-tract configuration include a first length on an oral cavity side of a vocal tract of a speaker, and a second length on a pharyngeal cavity side of the speaker.

9. The speaker clustering apparatus as claimed in claim 7, wherein the feature quantities of the vocal-tract configuration include vocal-tract lengths of speakers.

* * * * *